United States Patent
Kobayashi

(10) Patent No.: US 6,647,817 B2
(45) Date of Patent: Nov. 18, 2003

(54) AUTOMATIC TRANSMISSION

(75) Inventor: Toshio Kobayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/780,181

(22) Filed: Feb. 9, 2001

(65) Prior Publication Data

US 2001/0013258 A1 Aug. 16, 2001

(30) Foreign Application Priority Data

Feb. 14, 2000 (JP) ........................... 2000-034878
Feb. 14, 2000 (JP) ........................... 2000-035066
Feb. 23, 2000 (JP) ........................... 2000-045405

(51) Int. Cl.[7] .............................................. F16H 3/08
(52) U.S. Cl. ........................... 74/359; 74/331; 74/333; 74/335
(58) Field of Search .................. 74/359, 730.1, 74/335, 336 R, 333, 331, 325

(56) References Cited

U.S. PATENT DOCUMENTS 3,769,857 A  * 11/1973  Whateley ..................... 74/730
3,916,714 A  * 11/1975  Sisson et al. ................. 74/331
6,332,371 B1 * 12/2001  Ohashi et al. ................ 74/331

FOREIGN PATENT DOCUMENTS

JP    09014420   *  1/1997  ........... F16D/48/06
JP    2001311466 *  11/2001 ........... F16H/61/08

OTHER PUBLICATIONS

Japanese Patent Application 58–149443, Sep. 5, 1983.
Japanese Patent Application 63–2735, Jan. 7, 1988.
Japanese Patent Application 61–45163, Mar. 5, 1986.
Japanese Patent Application 2703169, Oct. 3, 1997.

* cited by examiner

Primary Examiner—Sherry Estremsky
Assistant Examiner—Tisha D. Lewis
(74) Attorney, Agent, or Firm—Martin A. Farber

(57) ABSTRACT

An automatic transmission including an input shaft, an output shaft, a main clutch for transmitting a power of an engine to the input shaft, and synchromesh mechanisms for automatically changing over a plurality of shift gear trains, comprises an intermediate shaft disposed on an axis other than the input and output shafts and a sub clutch mounted on the intermediate shaft for variably controlling a transmission torque transmitted from the input shaft to the output shaft on shifting gears.

35 Claims, 16 Drawing Sheets

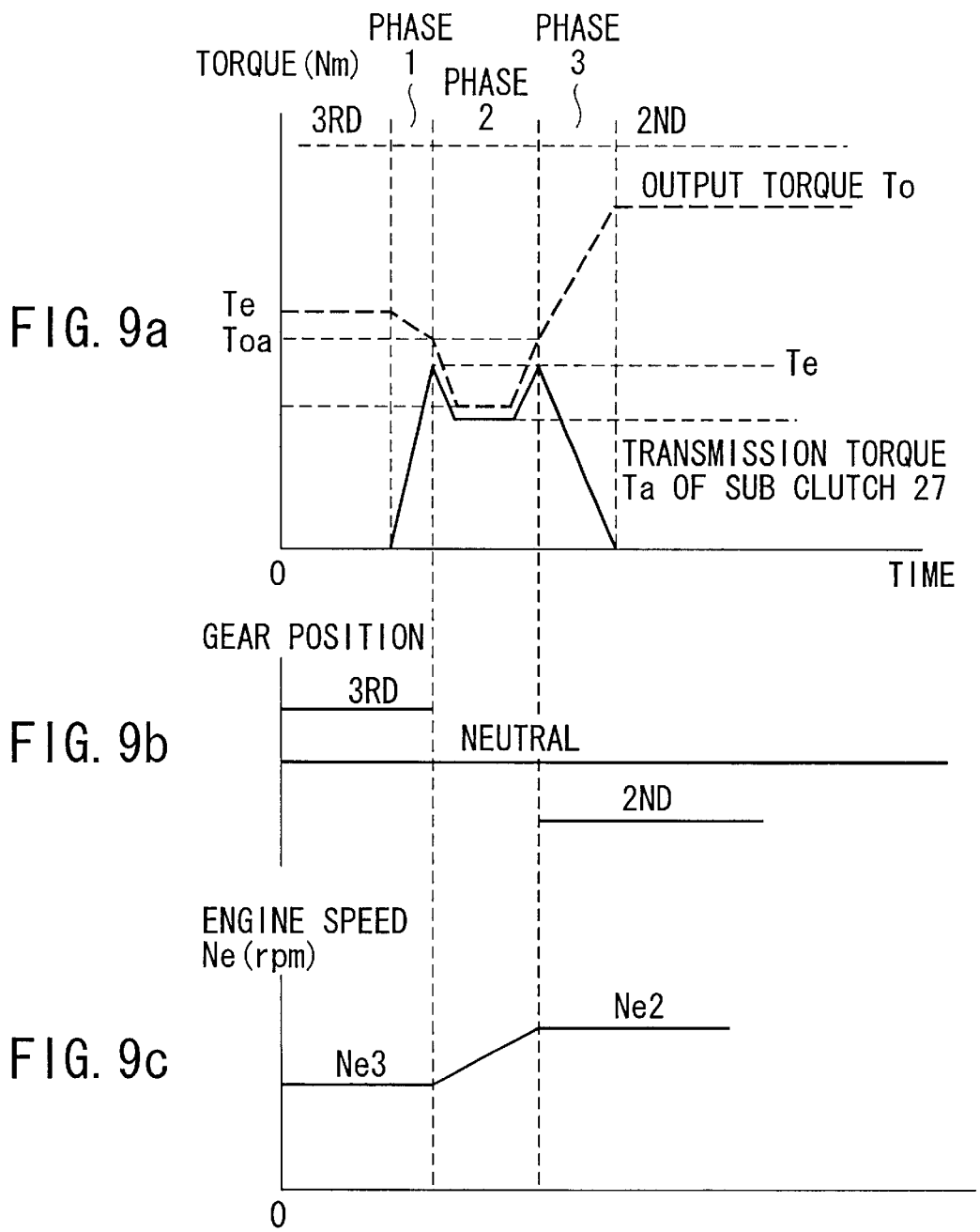

AUTOMATIC TRANSMISSION

BACKGROUND OF THE INVENTION

1. Field of the Invention

The present invention relates to an automatic transmission and more particularly to an automatic transmission whose gear mechanism is of a conventional manual transmission.

2. Prior Art

There is a known automatic transmission having the same gear mechanism as that of a conventional manual transmission. The automatic transmission of this type has a plurality of gear trains arranged in an axial direction of the transmission and changeover mechanisms for changing gear trains. The shift change is performed by automatically controlling these changeover mechanisms by means of hydraulic pressure. This type automatic transmission has an excellent transmission efficiency of power, compared to a conventional automatic transmission primarily constituted by planetary gears, friction engagement elements (clutches, brakes) and the like. Further, since this type automatic transmission is constituted by a small number of components, it is easier to design a light weight and low cost transmission than a conventional type automatic transmission.

For example, Japanese Patent Application Laid-open No. Toku-Kai-Sho 63-2735 discloses a structure of an automatic transmission in which a sub clutch for preventing a "torque drop" at shifting gears is equipped in addition to a main clutch disposed between a crank shaft of an engine and an input shaft of the transmission. This sub clutch is disposed at an end of the input shaft of the transmission. When shifting gears, the sub clutch is partially engaged by hydraulic pressure while the main clutch is held in full engagement, thereby an output torque during shifting gears is prevented from dropping abruptly and a shift shock at up-shift is alleviated. Further, automatic transmissions having similar constructions are disclosed in Japanese Patent Application Laid open No. Toku-Kai-Sho 61-45163 and Japanese Patent No. 2703169.

Further, Japanese Patent Application No. Toku-Kai-Sho 58-149443 discloses a construction in which a sub clutch is disposed on an axis of a counter shaft provided in parallel with an input shaft and an output shaft of the transmission. Specifically, a drive gear of a second speed gear train and a drive gear of a fourth speed gear train are rotatably mounted on the counter shaft and a changeover mechanism is interposed between these drive gears. Further, driven gears of these gear trains are secured to the output shaft provided in parallel with the counter shaft. Further, the sub clutch is disposed at the end of the counter shaft corresponding to a mounting shaft of the shift gears (drive gears). The sub clutch is engaged or disengaged by hydraulic pressure on shifting gears.

In these prior automatic transmission described above, The sub clutch is disposed on the mounting shaft of the shift gears. Normally, a plurality of drive gears and a shift mechanism including changeover mechanisms and the like are disposed almost on allover the mounting shaft in an axial direction. Accordingly, in case where a sub clutch is mounted on the mounting shaft, in order to secure a space for accommodating the sub clutch on the mounting shaft, it is necessary to enlarge a longitudinal or axial size of the mounting shaft. Hence, an axial size of the transmission becomes larger than that of a prior type transmission. As a result, it becomes difficult to maintain the exchangeability with a prior type of a transmission (for example, manual transmission).

SUMMARY OF THE INVENTION

It is a primary object of the present invention to incorporate a sub clutch into a transmission case without increasing an axial size of the transmission. It is a further object of the present invention to provide a transmission having an exchangeability with a prior type of a transmission.

To achieve these objects, an automatic transmission having an input shaft, an output shaft, a main clutch for transmitting a power of an engine to the input shaft, shift gear trains for producing a specified gear ratio and a plurality of changeover mechanisms for automatically changing over the shift gear trains at shifting gears, comprises a plurality of mounting shafts for mounting respective shift gears of the shift gear trains, an intermediate shaft disposed on an axis other than axes of the mounting shafts and a sub clutch mounting on the intermediate shaft for variably controlling a torque transmitted from the input shaft to the output shaft when shifting gears.

BRIEF DESCRIPTION OF THE DRAWINGS

FIG. 9a is a time versus chart of torque at down-shift;

FIG. 9b is a time versus chart of gear position at down-shift;

FIG. 9c is a time versus chart of engine revolution at down-shift;

DETAILED DESCRIPTION OF THE PREFERRED EMBODIMENTS

Figure 1:
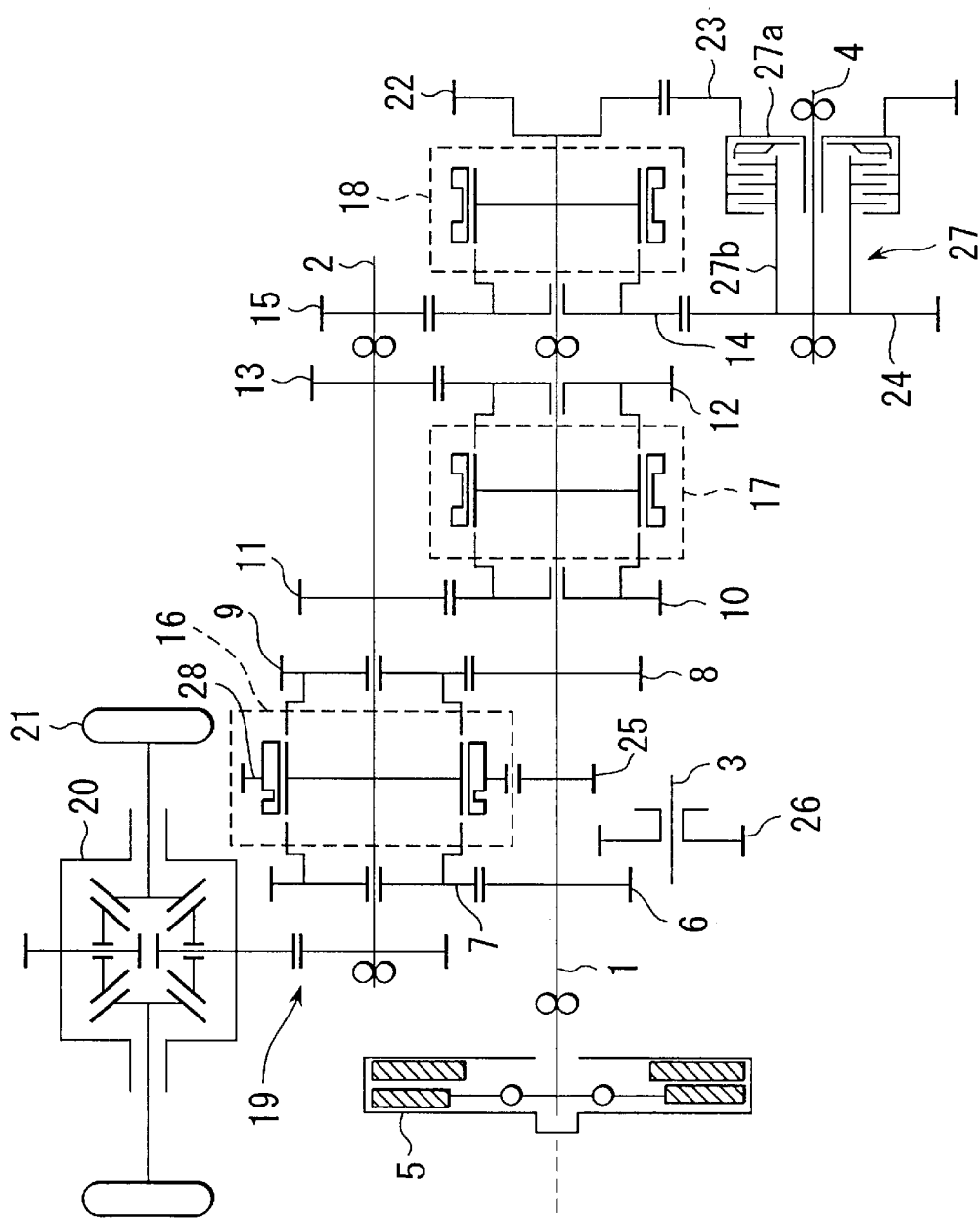
FIG. 1 is a skeleton diagram showing an automatic transmission according to a first embodiment of the present invention.
Figure 2:
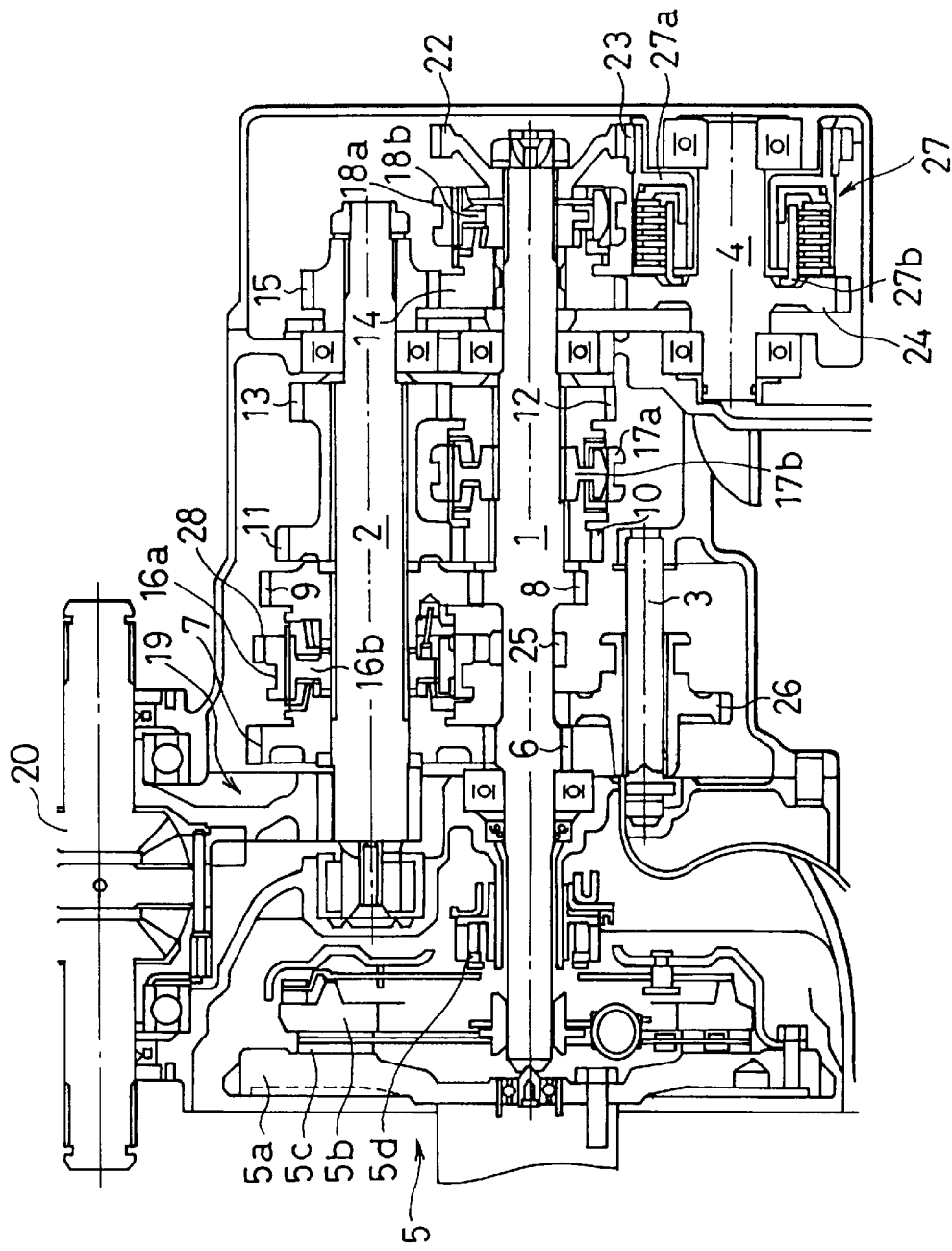
FIG. 2 is a sectional view of an automatic transmission according to a first embodiment.

FIG. 1 is a skeleton diagram showing an automatic transmission having five forward speed ratios and FIG. 2 is a sectional view of the transmission. This automatic transmission is a transaxle type transmission transversely mounted on a vehicle. In a transmission case, an input shaft 1, an output shaft 2, an idler shaft 3 and an intermediate shaft 4 are disposed in parallel with each other. It should be noted that the intermediate shaft 4 is disposed at an axis different from an axis of the input shaft 1 and also from an axis of the output shaft 2. Torque inputted from an engine (not shown) is transmitted from the input shaft 1 to the output shaft 2 through a specific gear train.

A main clutch 5 (in this embodiment, single disc clutch) is engaged or disengaged by a hydraulic control to transmit a power of a crankshaft (not shown) of the engine to the input shaft 1 of the automatic transmission or to shut off the power. Specifically, as shown in FIG. 2, a flywheel 5a is directly connected with the crankshaft and a clutch disk 5c is provided between the flywheel 5a and a pressure plate 5b. The clutch disc 5c is spline-fitted over the input shaft 1 through a clutch hub provided on an inner periphery surface thereof. Further, a release bearing 5d is slidably mounted on the input shaft 1. When the pressure plate 5b presses the clutch disc 5c towards the flywheel 5a, the power of the crankshaft is transmitted to the input shaft 1. On the other hand, when the release bearing 5d slides leftward in FIG. 2 by means of hydraulic pressure, the clutch disc 5c is released, thereby the transmission of the power is shut off.

There are provided a plurality of gear trains by which respective speed ratios are established from the 1st gear ratio to the 5th gear ratio between the input shaft 1 and the output shaft 2. With respect to forward gear trains, a 1st speed gear train 6 and 7, a 2nd speed gear train 8 and 9, a 3rd speed gear train 10 and 11, a 4th speed gear train 12 and 13, and a 5th speed gear train 14 and 15 are arranged from left to right in this order. A 1st speed drive gear 6 is fixedly mounted on the input shaft 1. Further, a 1st speed driven gear 7 meshing with the drive gear 6 is rotatably mounted on the output shaft 2. Similarly, a 2nd speed drive gear 8 is fixedly mounted on the input shaft 1 and a 2nd speed driven gear 9 meshing with the drive gear 8 is rotatably mounted on the output shaft 2. On the other hand, a 3rd speed drive gear 10 is rotatably mounted on the input shaft 1 and a 3rd speed driven gear 11 meshing with the drive gear 10 is fixedly mounted on the output shaft 2. Further, a 4th speed drive gear 12 is rotatably mounted on the input shaft 1 and a 4th speed driven gear 13 meshing with the drive gear 12 is fixedly mounted on the output shaft 2. Further, a 5th speed drive gear 14 is rotatably mounted on the input shaft 1 and a 5th speed driven gear 15 meshing with the drive gear 14 is fixedly mounted on the output shaft 2. The speed ratio of respective shift stages is determined by a gear ratio of the corresponding gear train.

The changeover between the respective forward speed gear trains is performed by three synchromesh mechanism 16, 17 and 18. A first synchromesh mechanism 16 is provided on the output shaft 2 between the 1st speed driven gear 7 and the 2nd speed driven gear 9. A second synchromesh mechanism 17 is provided on the input shaft 1 between the 3rd speed drive gear 10 and the 4th speed drive gear 12. Further, a third synchromesh mechanism 18 is provided on the input shaft 1 in the vicinity of the 5th speed drive gear. The structure of these synchromesh mechanisms 16, 17 and 18 is of a well-known type. As shown in FIG. 2, the shift of synchrosleeves 16a, 17a and 18a in an axial direction is automatically controlled by hydraulic pressure. Precisely, this automatic control is accompanied by a synchronized control of a sub clutch 27 which will be described hereinafter. Describing only the shift motion of the synchromesh mechanisms 16, 17 and 18, for example, in case where the gear ratio is set to the 1st speed ratio, the synchrosleeve 16a is shifted leftward by hydraulic pressure while the synchrosleeves 17a and 18a are held in a neutral position, respectively. As the shift amount of the synchrosleeve 16a increases, the rotation of the synchrosleeve 16a is synchronized with that of the 1st speed driven gear 7. When both rotations are completely synchronized, an outer spline integrally formed with the 1st speed driven gear 7 is fitted to an inner spline of the sleeve 16a. The synchrosleeve 16a is constantly spline-fitted over a synchrohub 16b rotating integrally with the output shaft 2. Accordingly, the driving force of the input shaft 1 is transmitted to the output shaft 2 through the 1st speed gear train 6 and 7, the synchrosleeve 16a and the synchrohub 16b. On the other hand, in order to set the gear ratio to the 2nd speed ratio, the synchrosleeve 16a is shifted rightward by hydraulic pressure while the synchrosleeves 17a and 18a are retained in a neutral position, respectively. Further, in order to set the gear ratio to a 3rd or 4th speed ratio, the synchrosleeve 17a is shifted with other synchrosleeves set in a neutral position and in order to set the gear ratio to a 5th speed ratio, the synchrosleeve 18a is shifted while other synchrosleeves is set in a neutral position.

When the vehicle travels forwardly, the driving force of the input shaft 1 is transmitted to the output shaft 2 through the gear train selected by either of the synchromesh mechanisms 16, 17 and 18. Further, the rotation speed of the output shaft 2 is reduced by a final reduction gear train 19 and then the driving force is transmitted to a differential 20. Thus, the driving force is transmitted to driving wheels 21 and the driving wheels rotate in the forward direction.

Meanwhile, when the vehicle travels backward, first all synchromesh mechanisms 16, 17 and 18 are set to a neutral condition. In this condition, a reverse driven gear 28 integrally mounted on the outer periphery of the synchrosleeve 16a and a reverse drive gear 25 fixedly mounted on the input shaft 1 are arranged on the same plane perpendicular to the input shaft 1. On the other hand, when an idler gear 26 rotatably mounted on an idler shaft 3 slides in an axial direction on the idler shaft 3, the idler gear 26 meshes with both of the reverse drive gear 25 and the reverse driven gear 28. Thereby, the driving force of the input shaft 1 is transmitted to the output shaft 2 through the reverse drive gear 25, the idler gear 26 and the revereser driven gear 28. Since the driving force is transmitted to the output shaft 2 via the idler gear 26, the output shaft 2 rotates reversely.

Further, the intermediate shaft 4 arranged below the input shaft 1 is provided with a sub clutch 27 composed of a hydraulically controlled multiple disc clutch. The sub clutch 27 has a pair of rotation members comprising a clutch drum 27a and a clutch hub 27b. When the gear is changed using the synchromesh mechanisms 16, 17 and 18, the sub clutch 27 is partially engaged, so a torque delivery path passing through an input gear train 22 and 23, the sub clutch 27, an output gear train 24, 14 and 15, is established. Specifically, a first intermediate gear 22 is fixedly mounted at an end of the input shaft 1 (on an opposite side of the main clutch 5) and meshes with a second intermediate gear 23 rotatably mounted on the intermediate shaft 4. This second intermediate gear 23 is integrally connected with the clutch drum 27a. Further, the clutch hub 27b of the sub clutch 27 is integrally connected with a third intermediate gear 24 fixedly mounted on the intermediate shaft 4. Further, the third intermediate gear 24 meshes with the 5th speed driven gear 15 integrally mounted on the output shaft 2 through the 5th speed drive gear 14 rotatably mounted on the input shaft 1.

The gear ratio of the gear train 22, 23 or the gear train 14, 24 is established on a speed increase side or a speed reduction side. Generally, when the gear is changed from 1st to 2nd or from 2nd to 3rd, that is, when the gear change is performed on a low speed side, the shift shock due to a torque drop is relatively large. On the other hand, when the gear is changed from 4th to 5th, that is, when the gear change is performed on a high speed side, the shift shock is not so large as a driver feels uncomfortable. Accordingly, an overall gear ratio including the input gear train 22 and 23 and the output gear train 24, 14 and 15 is established at a value corresponding to the 3rd to 4th gear position. In this embodiment, for example, the number of teeth is 20 for the first intermediate gear 22 and is 30 for the second intermediate gear 23. Accordingly, the gear ratio of the input gear train 22 and 23 is established at 1.5. Further, the number of teeth is 15 for the 5th speed driven gear 15 and is 24 for the third intermediate gear 24. Hence, the gear ratio on the output side is established at 0.75. The total gear ratio including the input gear train 22 and 23 and the output gear train 24, 14 and 15 is established at 1.125. This value corresponds to a speed ratio between the 3rd gear ratio (for example 1.3) and the 4th gear ratio (for example 1.0).

Figure 7:
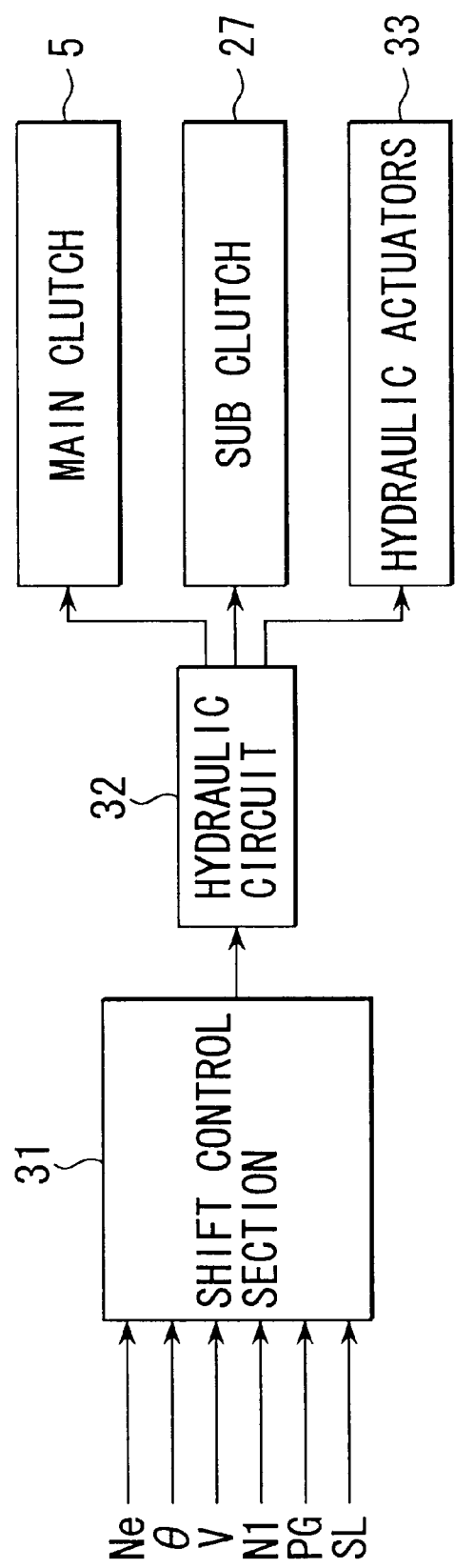
FIG. 7 is a block diagram of a shift control system.

Thus constituted automatic transmission is controlled according to a shift control system as shown in FIG. 7. A shift control section 31 of the system receives miscellaneous signals, such as engine speed Ne, accelerator pedal opening angle θ (or throttle valve opening angle), vehicle speed V, revolution speed of the input shaft 1 Ni, selected gear position PG, position of a selector lever SL and the like. Then, based on these signals the shift control section 31 determines a gear position corresponding to the current traveling condition and outputs appropriate control signals to a hydraulic circuit 32. The hydraulic circuit 32 is constituted by an oil pump driven by an engine or an electric motor, an electromagnetic valve and the like and supplies a regulated hydraulic pressure to the main clutch 5, the sub clutch 27 and hydraulic actuators 33 respectively, according to the control signals from the shift control section 31. The hydraulic actuators 33 include miscellaneous actuators for sliding the synchrosleeves 16a, 17a and 18a and the idler gear 26.

The main clutch 5, the sub clutch 27 and the synchromesh mechanisms 16, 17 and 18 are controlled in the following manner. First, when the selector position SL is established at a forward traveling range by operating a selector lever, the synchrosleeve 16a is shifted toward the first speed drive gear 6 to select the first gear position. Further, when the accelerator pedal is depressed, the main clutch 5 is engaged by hydraulic pressure fed from the hydraulic circuit 32 and the vehicle travels. Further, with an increase of the vehicle speed, the gear is up-shifted according to the shift schedule programmed in the shift control section 31.

Figure 3:
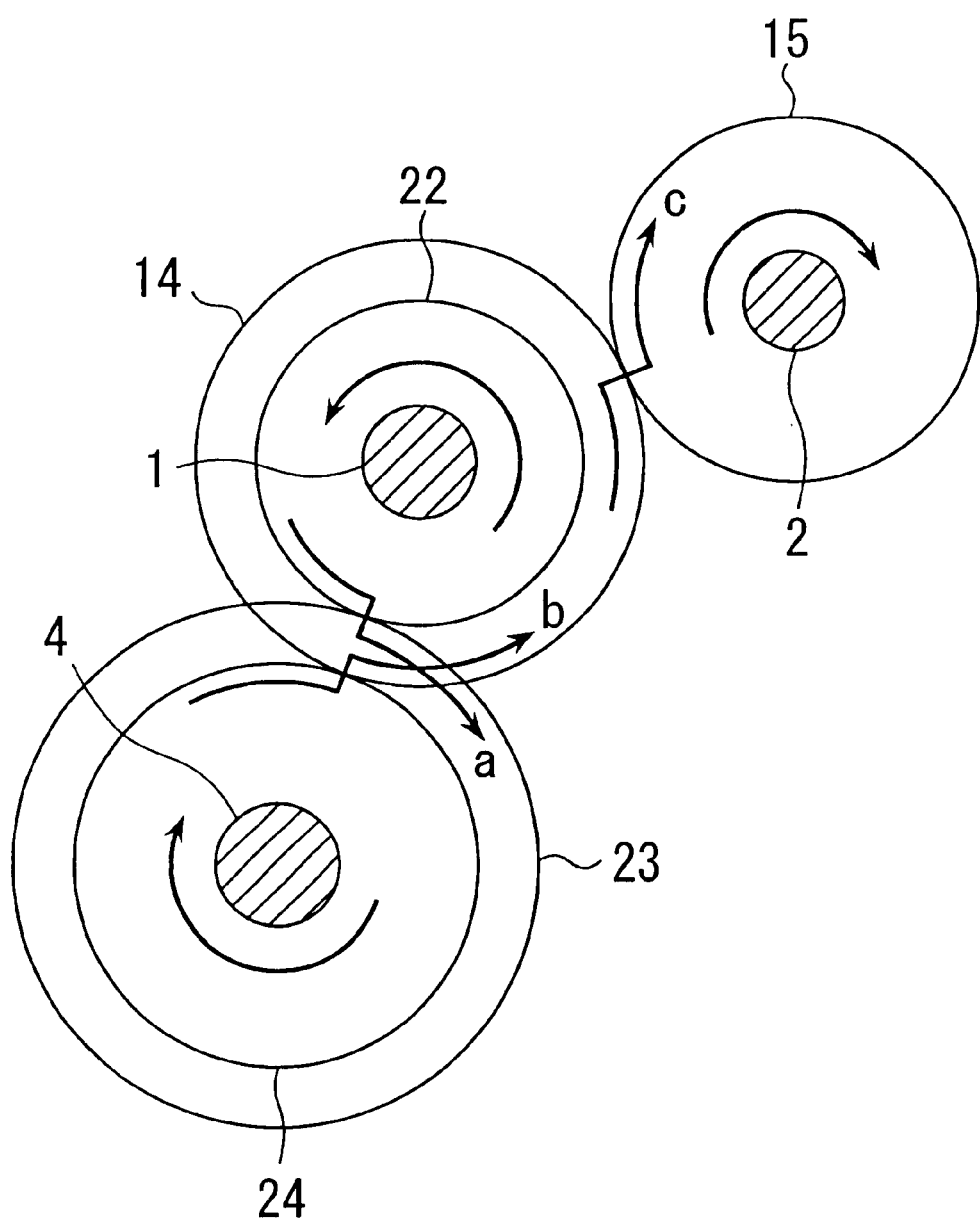
FIG. 3 is an explanatory view showing a torque delivery path via a sub clutch.

When the gear is changed, the sub clutch 27 starts engagement while the main clutch 5 is fully engaged and is held in a partially engaged state. Thereby, two power delivery paths, one is a path through the first speed gear train 6 and 7 and another is a path through the sub clutch 27, are formed. That is, as shown in FIG. 3, the power of the input shaft 1 is transmitted to the clutch drum 27a of the sub clutch 27 through the gear train 22, 23 which rotates integrally with the input shaft 1 (arrow mark a). Next, the power of the clutch drum 27a is transmitted to the clutch hub 27b according to the degree of engagement. Further, the power is transmitted to the output shaft 2 through the gear train 24, 14, 15 (arrow marks b, c). In this power delivery path, the fifth speed drive gear 14 acts as an idler gear.

Figure 8A:
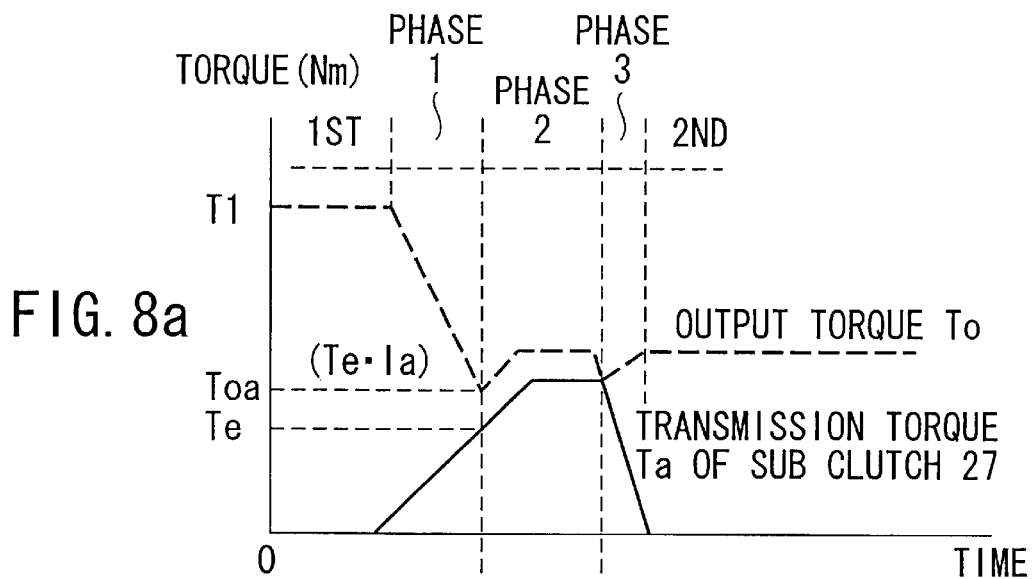
FIG. 8a is a time-versus chart of torque at up-shift.
Figure 8B:
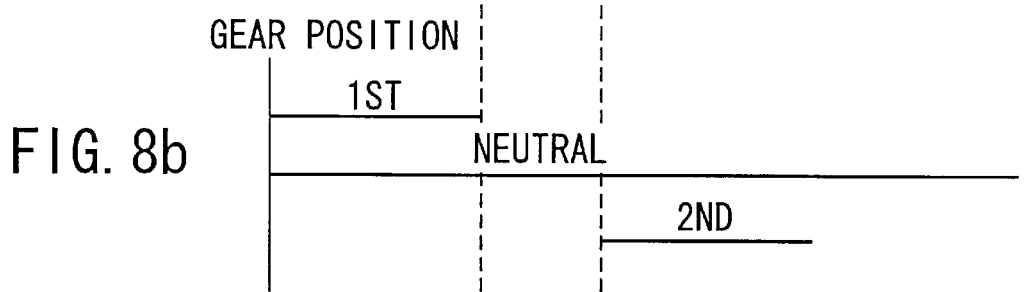
FIG. 8b is a time-versus chart of gear position at up-shift.
Figure 8C:
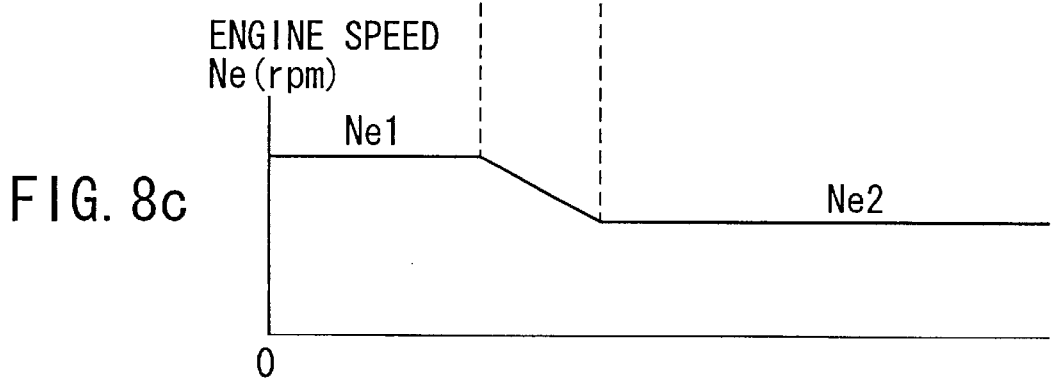
FIG. 8c is a time-versus chart of engine revolution at up-shift.

While the sub clutch 27 is held in a partially engaged state, according to the control pattern as shown in FIG. 8 or 9 for example, the transmission torque of the sub clutch 27 is variably controlled and at the same time the revolution of the input shaft 1 is synchronized with that of the output shaft 2. FIG. 8 shows a transference of the transmission torque control of the sub clutch 27 when the gear is up-shifted from the 1st gear position to the 2nd gear position. In the power delivery path through the sub clutch 27, since the total gear ratio Ia of the input and output gear trains is established at 1.125 (corresponding to the speed ratio between 3rd gear position and the 4th gear position), a part of the torque of the input shaft 1 is delivered to the output shaft 2 through the sub clutch 27 according to the state of engagement of the sub clutch 27. Further, when the transmission torque Ta of the sub clutch 27 is equalized with the engine torque Te, in other words, when all engine torque Te is delivered through the sub clutch 27, the transmission torque T1 of the first speed gear train 6, 7 becomes substantially zero. In this instant, the synchrosleeve 16a of the first synchromesh mechanism 16 is shifted to a neutral position (phase 1). The first synchromesh mechanism 16 comes into a neutral state. Further, when the transmission torque Ta of the sub clutch 27 goes up, the power delivered through the gear trains 22, 23, 24, 14, 15 is outputted to the output shaft 2. At this moment, since the total gear ratio Ia of the gear trains 22, 23, 24, 14, 15 is established at a speed ratio (1.125) corresponding to the third to fourth gear position, the engine speed Ne1 at the first gear position goes down toward an engine speed at the 3rd or 4th gear position (phase 2). In this process, when the engine speed reaches an engine speed Ne2 corresponding to the 2nd gear position, the gear is up-shifted to the 2nd gear position. Then, when the up-shift is completed, the sub clutch 27 stops the torque control (phase 3). On the other hand, FIG. 9 shows the transference of the transmission torque control when the gear is down-shifted from the 3rd gear position to the 2nd gear position. According to this torque control, the engine speed goes up while the second synchromesh mechanism 17 is in a neutral position. In this process, the engine speed becomes an engine speed corresponding to the selected 2nd gear position, thereby the down-shift is performed.

Thus, according to the first embodiment, the sub clutch 27 can be accommodated in the transmission efficiently without increasing the axial or longitudinal size of the transmission. In prior automatic transmissions, since gear trains and shift mechanisms are mounted on almost allover the mounting shaft of shift gears in the axial direction, in case where the sub clutch 27 is mounted on the mounting shaft, it is necessary that the length of the mounting shaft is elongated by the accommodation space. On the other hand, in the automatic transmission according to this embodiment, the sub clutch 27 is mounted on the intermediate shaft 4 provided specially, separately from the input or output shaft. Accordingly, it is not necessary to elongate the length of the input and output shafts 1, 2. As a result, since the transmission case has almost the same axial size as the manual transmission having identical numbers of gear positions, the exchangeability with other types of transmission can be secured when it is mounted on a vehicle.

Further, with respect to the layout of the automatic transmission, it is not necessary to make a large modification of an original manual transmission on which the automatic transmission is based. In particular, the layout of components around the input and output shafts 1, 2 is identical to that of the manual transmission except for the first intermediate gear 22 newly added at the end of the input shaft 1. In this embodiment, the input gear train 22, 23 is added but, with respect to the output gear train, the 5th speed gear train 14, 15 is employed. Accordingly, it is not necessary to add a new gear to the output shaft 2. Thus, since the output gear train of the sub clutch 27 is constituted using the original gear train 14, 15, it is not necessary to make big modifications of the layout around the input and output shafts 1, 2. As a result, it is possible to share components or manufacturing facilities between automatic transmissions and manual transmissions.

Further, since the automatic transmission according to this embodiment has a relatively small number of components compared to the ordinary automatic transmission, it is easy to reduce weight and manufacturing cost. Further, since the automatic transmission of this type has a high power transmission efficiency, it is possible to contribute to the realization of high fuel economy cars.

Further, when the gear is changed, the going-down of driving force during gear change (torque drop) can be prevented by variably controlling transmission torque of the sub clutch 27, thereby a so-called shift quality is enhanced.

Figure 10:
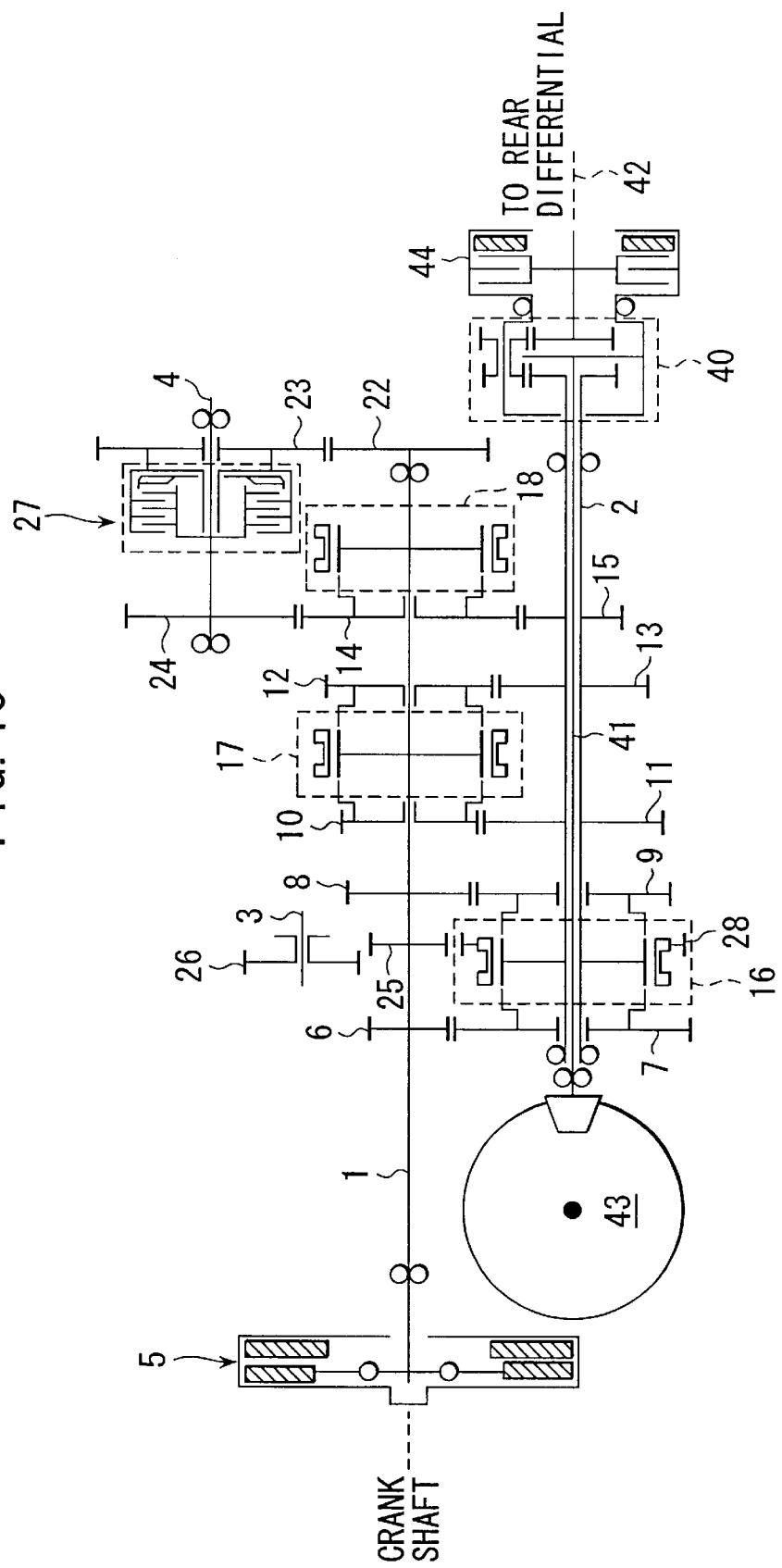
FIG. 10 is a skeleton diagram showing an automatic transmission according to a second embodiment.

FIG. 10 is a skeleton diagram showing a five forward speed automatic transmission according to a second embodiment. This is a transaxle type transmission longitudinally mounted on a vehicle. Reference numeral 41 denotes a front drive shaft for transmitting power to front wheels. The front drive shaft penetrates a hollow output shaft 2 in the axial direction and is rotatably mounted on the output shaft 2. Further, reference numeral 42 denotes a rear drive shaft for transmitting power to rear wheels.

The power transmitted to the output shaft 2 is distributed into the front drive shaft 41 and the rear drive shaft 42 through a planetary center differential 40. The power of the front drive shaft 41 is transmitted to left and right front wheels through a front differential 43. Similarly, the power of the rear drive shaft 42 is transmitted to left and right rear wheels through a rear differential (not shown).

A differential limiting mechanism 44 constituted by a multiple disc clutch is interposed between the planetary center differential 40 and the rear drive shaft 42. This differential limiting mechanism 44 is provided for obtaining good maneuverability. The engagement condition of the multiple disc clutch in the mechanism 44 is controlled according to vehicle traveling conditions (for example, a degree of tire slip, a steering angle).

In thus constituted automatic transmission, when the gear is changed, the sub clutch 27 is partially engaged while the main clutch 5 is engaged. The rotation number of the input shaft 1 is synchronized with that of the output shaft 2 by variably controlling the transmission torque of the sub clutch 27. Thus, the drop of driving force is alleviated, thereby shift shocks can be prevented effectively.

In the same manner as in the first embodiment, also in this embodiment, the sub clutch can be accommodated efficiently without increasing the axial size of the transmission, while the exchangeability with other types of transmission is retained.

Figure 4:
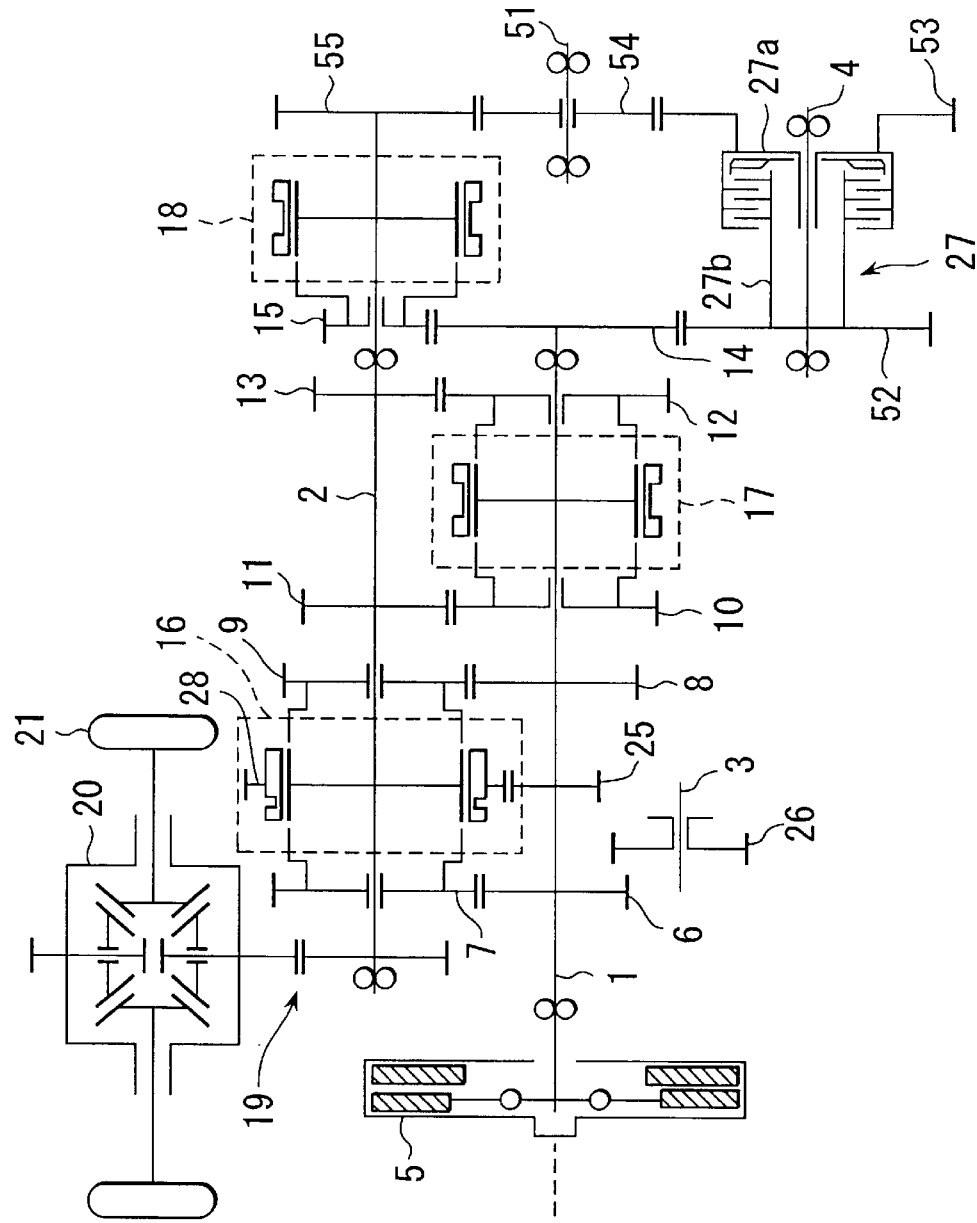
FIG. 4 is a skeleton diagram showing an automatic transmission according to a third embodiment of the present invention.
Figure 5:
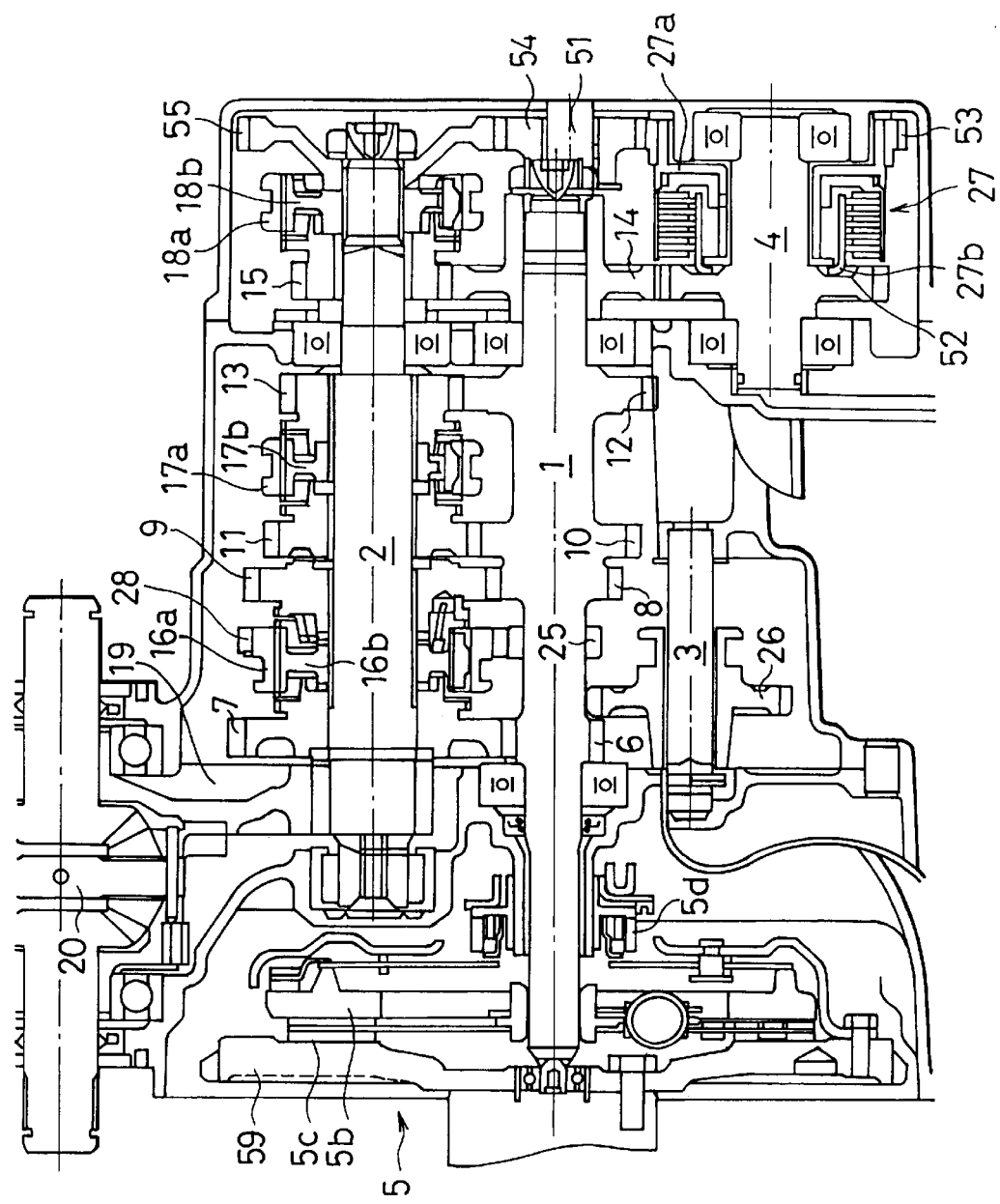
FIG. 5 is a sectional view of an automatic transmission according to a third embodiment.

FIG. 4 is a skeleton diagram showing a five forward speed automatic transmission according to a third embodiment and FIG. 5 is a sectional view of the transmission. This is a transaxle type transmission transversely mounted on a vehicle in the same manner as in the first embodiment.

The third synchromesh mechanism 18 is mounted on the output shaft 2 and the 5th speed drive gear 14 is fixedly mounted on the input shaft 1. Further, the 5th speed driven gear meshing with this drive gear 14 is rotatably mounted on the output shaft 2. When the synchrosleeve 18a is splinefitted over the 5th speed driven gear, the power of the input shaft 1 is transmitted to the output shaft 2 through the gear train 14, 15, the synchrosleeve 18a and the synchro hub 18b.

When the gear is changed, the torque delivery path through the sub clutch 27 is formed as follows. This automatic transmission has a second intermediate shaft 51 newly added in addition to the input shaft 1, the output shaft 2 and the intermediate shaft 4. A first intermediate gear 52 fixedly mounted on the intermediate shaft 4 (hereinafter referred to as a first intermediate shaft) meshes with the 5th speed drive gear 14 and at the same time is integrally connected with the clutch hub 27b of the sub clutch 27. On the other hand, a second intermediate gear 53 rotatably mounted on the first intermediate shaft 4 is integrally connected with the clutch drum 27a and meshes with a third intermediate gear 54 (idler gear) rotatably mounted on the second intermediate 51. Further, the third intermediate gear 54 meshes with a fourth intermediate gear 55 fixedly mounted on the output shaft 2. In the same manner as in the first embodiment, the first intermediate shaft 4 on which the sub clutch 27 is mounted is provided on an axis different from the input and output shafts 1, 2.

The gear ratio of the input gear train 14, 52 or the output gear train 53, 54 and 55 of the sub clutch 27 is established on a speed increasing side or on a speed decreasing side. In view of preventing the drop of output torque at gear changes, in the same manner as in the first embodiment, the total gear ration of the input gear train 14, 52 and the output gear train 53, 54 and 55 is established at a value corresponding to the 3rd to 4th gear ratios.

Figure 6:
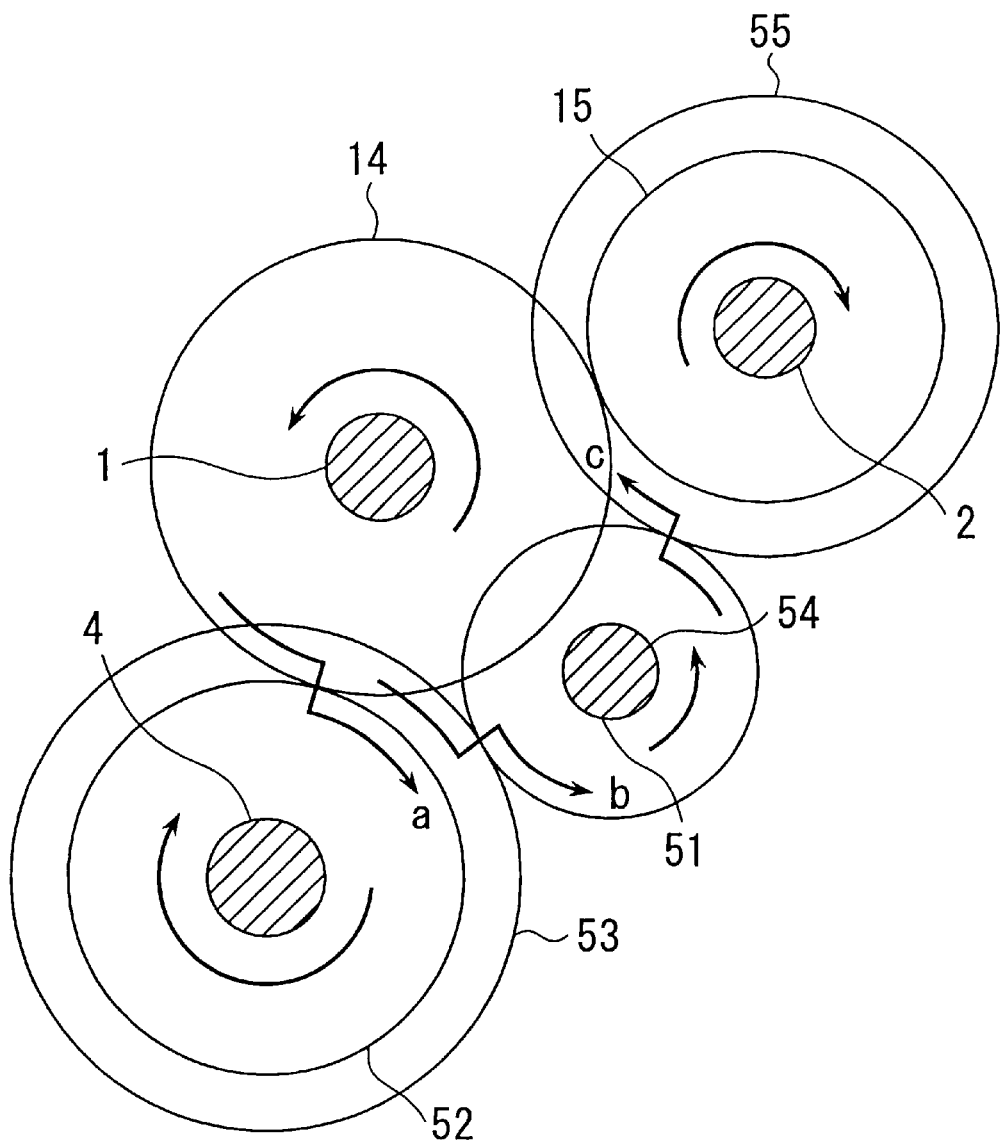
FIG. 6 is an explanatory view showing a torque delivery path of an automatic transmission according to a third embodiment at shift change.

When the gear is changed, since the sub clutch 27 is partially engaged, a power delivery path through the sub clutch 27 as shown in FIG. 6 is formed. That is, the power of the input shaft 1 is transmitted to the hub 27b of the sub clutch 27 through the gear train 14, 52 integrally rotating with the input shaft 1 (see arrow mark a). Next, the power of the clutch hub 27b is transmitted to the clutch drum 27a according to a degree of the engagement of the sub clutch 27. Then, the regulated power is transmitted to the output shaft 2 through the gear train 53, 54 and 55 (see arrow marks b and c). Thus, on shifting gears except $5^{th}$ speed, the power of the input shaft 1 is transmitted to the output shaft 2 through the sub clutch 27.

This embodiment has the same effect as in the first and second embodiments. The layout around the input and output shafts 1, 2 is the same as in the manual transmission except for a fourth intermediate gear 55 added at the end of the output shaft 2. That is, in order to constitute an output gear train of the sub clutch 27, the fourth intermediate gear 55 and the third intermediate gear 54 mounted on the second intermediate shaft 51 are added. However, with respect to the input gear train, the existing $5^{th}$ speed drive gear 14 is employed. Therefore, with respect to the input gear train, it is not necessary to add a new gear to the input shaft 1. Thus, in either of the input and output gear trains of the sub clutch 27, if at least one existing gear constituting the gear train is used, the modification of the layout around the input and output shafts 1, 2 can be minimized.

In the aforesaid embodiments, the gear of the 5th gear position is employed for the gear train of the sub clutch 27, however shift gears of other gear position may be used.

Figure 11:
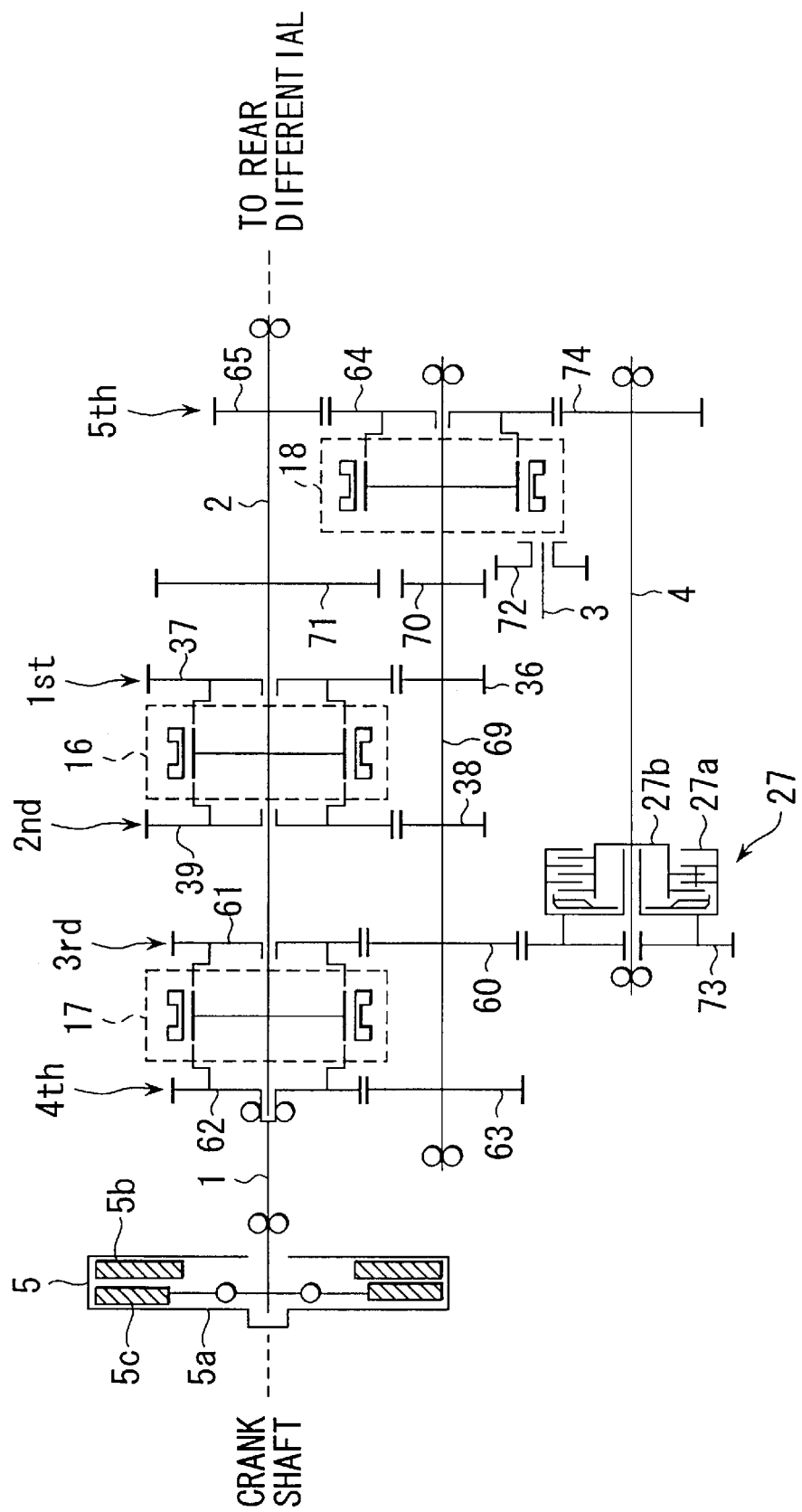
FIG. 11 is a skeleton diagram showing an automatic transmission according to a fourth embodiment of the present invention.

FIG. 11 is a skeleton diagram showing a five forward speed automatic transmission according to a fourth embodiment of the present invention. This is an automatic transmission longitudinally mounted on a front engine rear drive (hereinafter referred to as "FR") vehicle. In a transmission case, there are provided the input shaft 1, the output shaft 2, the idler shaft 3, the intermediate shaft 4 and the counter shaft 69 in parallel with each other. Particularly, the input shaft 1 is arranged coaxially with the output shaft 2. It should be noted that the intermediate shaft 4 is arranged on a different axis from the counter shaft 69 corresponding to one mounting shaft of transmission gears and also on a different axis from the output shaft 2 corresponding to the other mounting shaft of transmission gears. Basically, the power transmitted from an engine to the input shaft 1 is delivered to the counter shaft 69 through the 4th speed gear train 62, 63 and transmitted to the output shaft 2 through a specific gear train.

The main clutch 5 of a single disc type serves as transmitting or shutting off the power of the crankshaft of the engine by a hydraulic control.

There are provided a plurality of shift gear trains each of which determines respective speed ratios from 1st to 5th between the input shaft 1, the output shaft 2 coaxially coupled with the input shaft 1 and the counter shaft 69. With respect to forward shift gears, the 4th speed gear train 62, 63, the 3rd speed gear train 60, 61, the 2nd speed gear train 38, 39, the 1st speed gear train 36, 37 and the 5th speed gear train 64, 65 are disposed in the axial direction from left to right in this order.

The $1^{st}$ speed drive gear 36 is fixedly mounted on the counter shaft 69. Further, the 1st speed driven gear 37 meshing with this drive gear 36 is rotatably mounted on the output shaft 2. Similarly, the 2nd speed drive gear 38 is fixedly mounted on the counter shaft 69 and the 2nd speed driven gear 39 meshing with the drive gear 38 is rotatably mounted on the output shaft 2. On the other hand, the 3rd speed drive gear 60 is fixedly mounted on the counter shaft 69 and the 3rd speed driven gear 61 meshing with the drive gear 60 is rotatably mounted on the output shaft 2. Further, a gear 62 is secured to the input shaft 1 and a synchromesh mechanism 17 directly engageable with this gear 62 is mounted on the output shaft 2. Further, the 5th drive speed drive gear 64 is rotatably mounted on the counter shaft 69 and the 5th speed driven gear 45 meshing with this drive gear 64 is fixedly mounted on the output shaft 2. The speed ratio of respective gear positions is determined by the gear ratio of a corresponding shift gear train.

However, only for the 4th gear position, since the input shaft 1 is directly connected with the output shaft by the engagement of the synchromesh mechanism 17, the speed ratio is equal to 1.

The changeover of the respective forward shift gears is performed by operating three synchromesh mechanisms 16, 17 and 18 in the same way as described in the first embodiment.

Meanwhile, when the vehicle travels backward, first all synchromesh mechanisms 16, 17 and 18 are set to a neutral condition. In this condition, a reverse drive gear 70 fixedly mounted on the counter shaft 69 and a reveres driven gear 71 fixedly mounted on the are arranged on the same plane perpendicular to the counter shaft 69. On the other hand, when an idler gear 72 rotatably mounted on an idler shaft 3 slides in an axial direction on the idler shaft 3, the idler gear 72 meshes with both of the reverse drive gear 70 and the reverse driven gear 71. Thereby, the driving force of the counter shaft 69 is transmitted to the output shaft 2 through the reverse drive gear 70, the idler gear 72 and the reverese driven gear 71. Since the driving force is transmitted to the output shaft 2 via the idler gear 72, the output shaft 2 rotates reversely.

Further, the intermediate shaft 4 arranged below the counter shaft 69 is provided with a sub clutch 27 composed of a hydraulically controlled multiple disc clutch. The sub clutch 27 has a pair of rotation members comprising a clutch drum 27a and a clutch hub 27b. When the gear is changed using the synchromesh mechanisms 16, 17 and 18, the sub clutch 27 is partially engaged, so a torque delivery path passing through a gear train 60, 73, the sub clutch 27, a gear train 74, 64 and 65, is established between the counter shaft 69 and the output shaft 2. Specifically, a first intermediate gear 73 is rotatably mounted at an end of the intermediate shaft 4 and meshes with a 3rd speed drive gear 40 fixedly mounted on the counter shaft 69. This first intermediate gear 73 is integrally connected with the clutch drum 27a. Further, the clutch hub 27b of the sub clutch 27 is integrally connected with a second intermediate gear 74 fixedly mounted on the intermediate shaft 4. Further, the second intermediate gear 74 meshes with a fifth speed drive gear 64 rotatably mounted on the counter shaft 69. Accordingly, the power outputted from the sub clutch 27 (the power on the clutch hub side 27b) is transmitted to the output shaft 2 through the output gear train 74, 64 and 65.

In this embodiment, an overall gear ratio including the input gear train 60, 63 and the output gear train 74, 64 and 65 is established at a value corresponding to the 3rd to 4th gear position from the same view point as in the first embodiment.

Further, thus constituted automatic transmission is controlled according to a shift control system as shown in FIG. 7 in the same manner as in the first embodiment.

Figure 12:
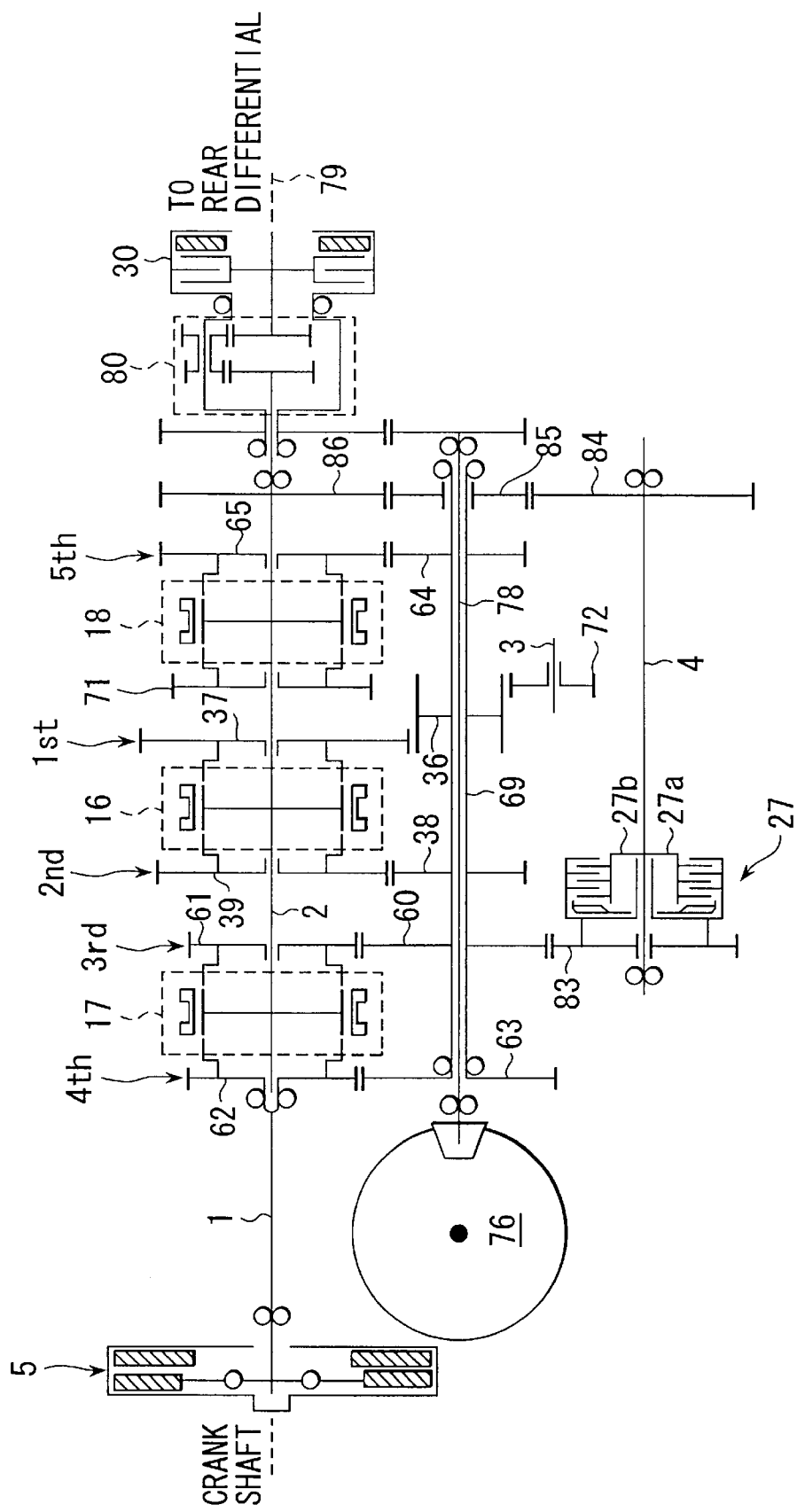
FIG. 12 is a skeleton diagram showing an automatic transmission according to a fifth embodiment of the present invention.

FIG. 12 is a skeleton diagram showing a five forward speed automatic transmission according to a fifth embodiment of the present invention. This transmission is a transaxle type transmission longitudinally mounted on a four wheel drive vehicle.

Reference numeral 78 denotes a front drive shaft for transmitting power to front wheels. The front drive shaft 78 is rotatably fitted to a hollow counter shaft 69. Further, reference numeral 79 denotes a rear drive shaft for transmitting power to rear wheels.

With respect to forward shift gears interposed between the output shaft 2 and the counter shaft 69, the 4th speed gear train 62, 63, the 3rd speed gear train 60, 61, the 2nd speed gear train 38, 39, the 1st speed gear train 36, 37 and the 5th speed gear train 64, 65 are disposed in the axial direction from left to right in this order. The drive gears 36, 38, 60, 63 and 64 are fixedly mounted on the counter shaft 69 and the driven gears 37, 39, 61, 62 and 65 are rotatably mounted on the output shaft 2. With respect to the disposition of the synchromesh mechanisms 16, 17 and 18, the difference from the first embodiment is that the third synchromesh mechanism 18 is disposed on the output shaft 2 between the 5th speed driven gear 65 and the reverse driven gear 71.

The power transmitted from the engine through the main clutch 5 of the input shaft 1 is delivered to the counter shaft 69 through the 4th gear train 62, 63. When the vehicle travels forward, the power of the counter shaft 69 is transmitted to the output shaft 2 through a forward gear train selected by operating either of the synchromesh mechanisms 16, 17 and 18 and is distributed by a planetary center differential 80 into a front drive shaft 78 and a rear drive shaft 79. The power of the front drive shaft 78 is transmitted to the front wheels through a front differential 76 and the power of the rear drive shaft 29 is transmitted to the rear wheels through a rear differential (not shown).

A differential limiting mechanism 30 constituted by a multiple disc clutch is interposed between a carrier of the center differential 80 and the rear drive shaft 79.

On the other hand, when the vehicle travels backward, the synchromesh mechanism 18 is changed over to a reverse driven gear 71 side with the synchmesh mechanisms 16, 17 retained in a neutral position. Thereby, the power of the counter shaft 69 is transmitted to the output shaft 2 through the 1st speed drive gear 36, the idler gear 72 and the reverse driven gear 71. Then, the rotational direction of the output shaft 2 is changed from forward to reverse due to the interposition of the idler gear 72.

Further, the sub clutch 27 is mounted on the intermediate shaft 4 arranged below the counter shaft 69. When the gear is changed, the sub clutch 27 controls transmission torque variably. Specifically, a first intermediate gear 83 is rotatably mounted on the intermediate shaft 4 and meshes with the 3rd speed drive gear 60 which rotates integrally with the counter shaft 69. Further, the first intermediate gear 83 is integrally connected with the clutch drum 27a of the sub clutch 27. Consequently, the power of the counter shaft 69 is delivered to the clutch drum 27a of the sub clutch 27 through the input gear train 60, 83. On the other hand, a second intermediate gear 84 integrally connected with the clutch hub 27b of the sub clutch 27 meshes with a third intermediate gear 85 rotatably mounted on the counter shaft 69. This third intermediate gear 85 meshes with a fourth intermediate gear 86 fixedly mounted on the output shaft 2. Accordingly, the power of the clutch hub 27b outputted according to the degree of engagement of the sub clutch 27 is transmitted to the output shaft 2 through the output gear train 84, 85 and 86.

In this embodiment, the layout around the mounting shafts 2, 69 of the shift gears is the same as the manual transmission except for the intermediate gears 85 and 86 added to the counter shaft 69 and the output shaft 2, respectively.

That is, the intermediate gears 85, 86 have been newly added in order to constitute the output gear train of the sub clutch 27. However, with respect to the input gear train, the existing 3rd speed drive gear 60 is employed. Therefore, it is not necessary to add a new gear to the counter shaft 69 for the input gear train. Thus, if at least one gear constituting shift gear trains is employed for either of the input side or the output side of the sub clutch 27, it is possible to minimize the modification of the layout around the mounting shafts of shift gears. As a result, it becomes possible to share the components or manufacturing facilities between manual transmissions and automatic transmissions.

In the aforesaid embodiments, an example of using a shift gear of the 3rd speed or 5th speed for the gear train of the sub clutch 27 has been described, however, other shift gear than 3rd speed or 5th speed may be employed.

Figure 13:
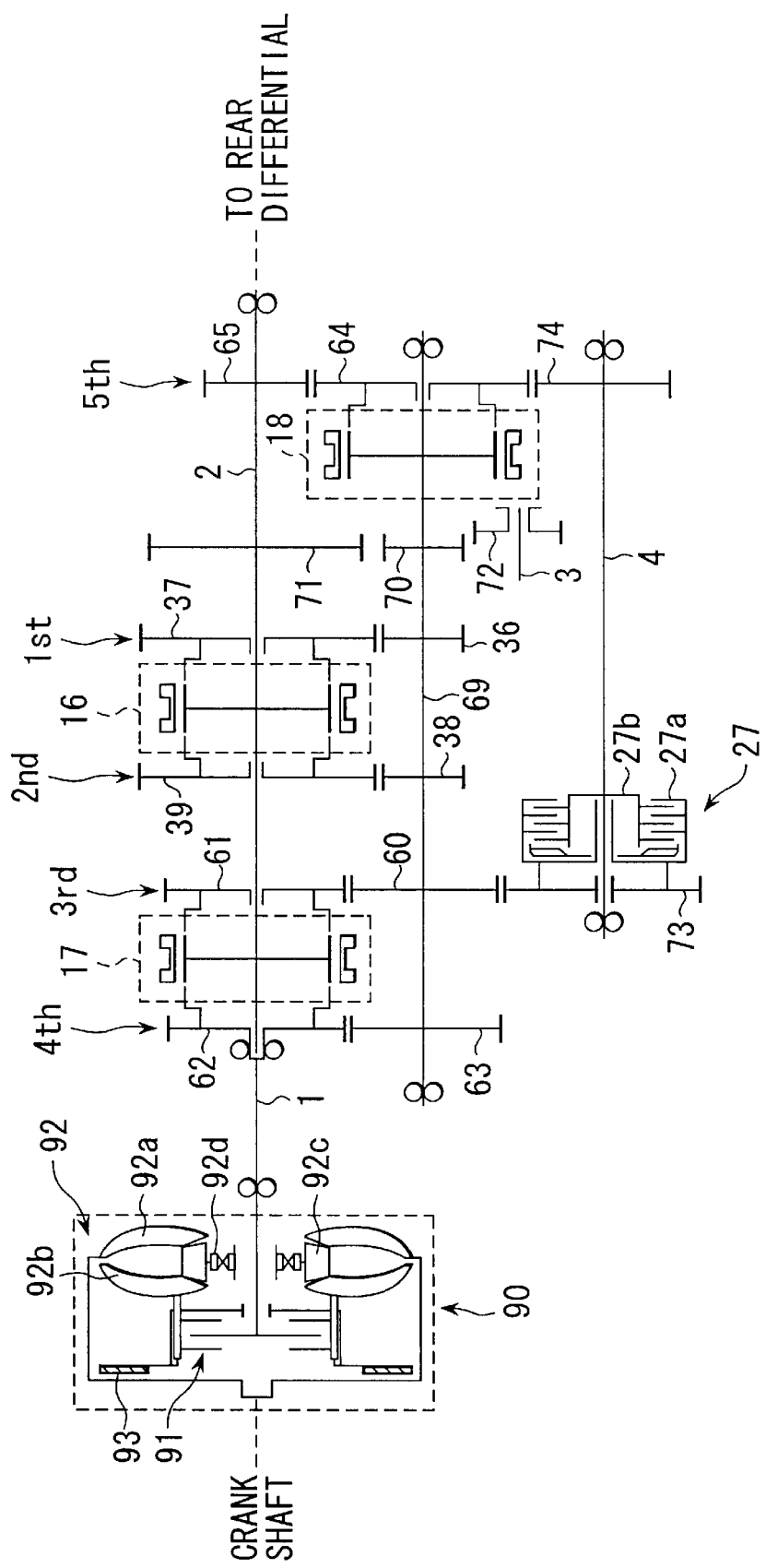
FIG. 13 is a skeleton diagram showing an automatic transmission according to a sixth embodiment of the present invention.

FIG. 13 is a skeleton diagram showing a five forward speed automatic transmission according to a sixth embodiment of the present invention. This embodiment is a variation of the fourth embodiment, that is, the main clutch 5 of the fourth embodiment is replaced with a power transmission mechanism 90 comprising a multiple disc wet clutch 91, a fluid torque converter 92 and a lock-up clutch 93.

The torque converter has a well-known structure, that is, an impeller 92a rotates integrally with a crankshaft and a turbine 92b rotates integrally with an input shaft 1 of the transmission. Further, a stator 92c has an one-way clutch 92d. In the torque converter range (in the condition where the rotational difference between the impeller 92a and the turbine 92b is large), the power of an engine is transmitted to the turbine 92b while being increased by a torque increase effect of the torque converter 92. Further, in the coupling range (in the condition where both turbine 92b and impeller 92a rotate at high speed and the stator 92c idles), since the torque converter 92 reaches a fluid coupling condition, no such torque increase is produced. Further, in order to enhance fuel economy, the lock-up clutch 93 is engaged, that is, connects the impeller 92a with the turbine 92b according to the vehicle traveling condition. The power transmitted to the turbine 92b of the torque converter 92 is delivered to the input shaft 1 through the main clutch 91 downstream of the turbine 92b. The main clutch 91 transmits the power of a clutch drum to the input shaft 1 or shuts off the power.

With respect to the changeover of the shift gears, since the structure of the transmission is basically the same as the fourth embodiment, further description is omitted.

Figure 16:
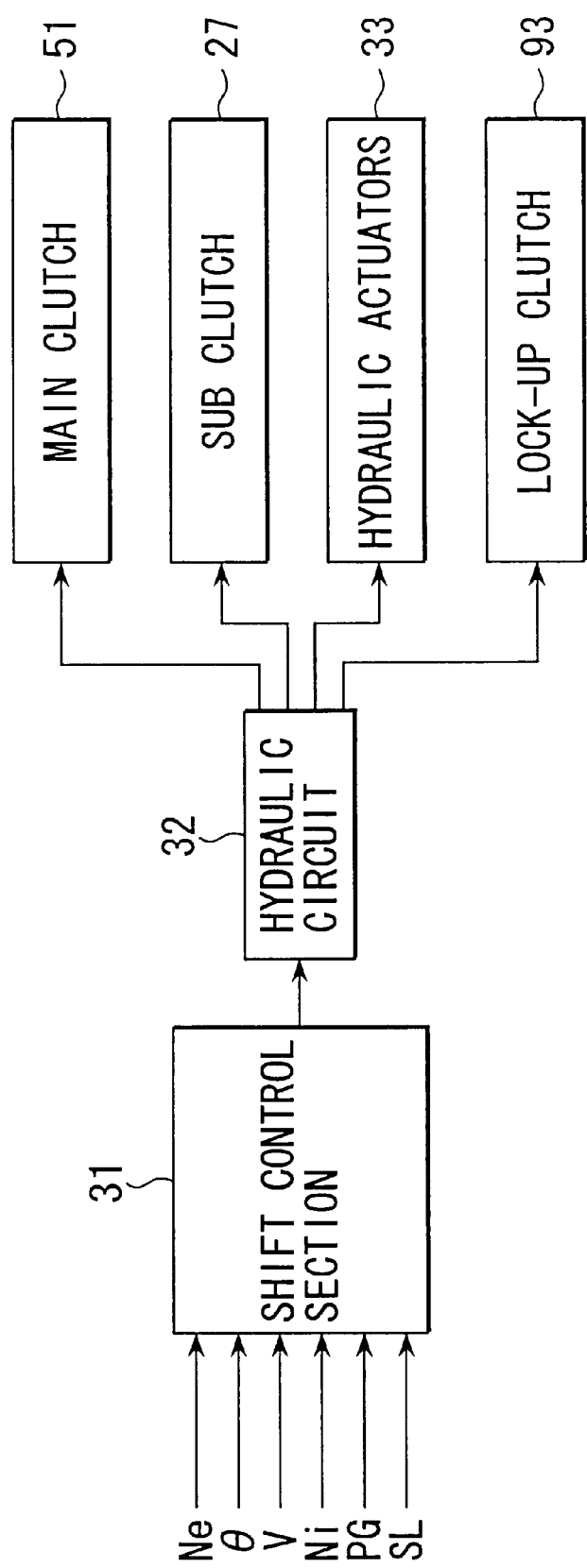
FIG. 16 is a block diagram of a shift control system according to the sixth, seventh and eighth embodiments.

In thus constituted automatic transmission, the shift control is performed according to a shift control system illustrated in FIG. 16. Also in a seventh and eighth embodiments which will be described hereinafter, the same shift control system is applied. The main clutch 91, the sub clutch 27, the lock-up clutch 93 and the hydraulic actuators 33 are operated according to control signals from the shift control section 31.

That is, the main clutch 91, the sub clutch 27, the lock-up clutch 93 and the synchromesh mechanism 16, 17 and 18 are in the following engagement condition when a selector lever is positioned at D (forward traveling) range.

Main clutch 91 basically engaged (released only when down-shift)

Sub clutch 27 partially engaged only when gear change

Synchromesh mechanisms 16, 17 and 18 changed over according to shift schedule Lock-up clutch 93 engaged at a speed range higher than a specified vehicle speed First, when the selector position SL is established at the D range by operating the selector lever, the synchromesh mechanism 16 is shifted toward the 1st speed drive gear to select the 1st gear position. Further, when the accelerator pedal is depressed, the main clutch 91 is engaged by hydraulic pressure fed from the hydraulic circuit 32 while the lock-up clutch 93 is released. As a result, the power of the engine is transmitted to the input shaft 1 through the torque converter 92, the main clutch 91 and the vehicle starts to travel. At this moment, since the engine power is amplified by the torque converter in slip condition and is transmitted to the input shaft 1, a large driving force is generated. Further, with an increase of the vehicle speed, the gear is up-shifted successively according to the shift schedule programmed in the shift control section 31. The lock-up clutch 93 is engaged at a speed range higher than a specified vehicle speed.

In this embodiment, the torque of the sub clutch 27 is controlled in the same manner as described in the first and fourth embodiments. Also in the seventh and eighth embodiments, the sub clutch 27 is controlled similarly.

Further, since the torque converter 92 is used as a power transmitting means connecting the engine and the automatic transmission, the torque amplifying effect of the torque converter 92 can be expected. That is, unless the torque converter is employed, in case where the vehicle starts on an upgrade while towing or tries to escape from rough roads, the main clutch is subjected to heat and abrasion repeatedly, and this leads to a problem of endurance of the clutch. Up-sizing of the main clutch produces an increase of inertia which provides overloads on the synchromesh mechanisms. On the other hand, if the torque converter is employed as in this embodiment, since the power of the engine is amplified by the torque converter, a large driving force can be secured, thereby good maneuverability is obtained.

Figure 14:
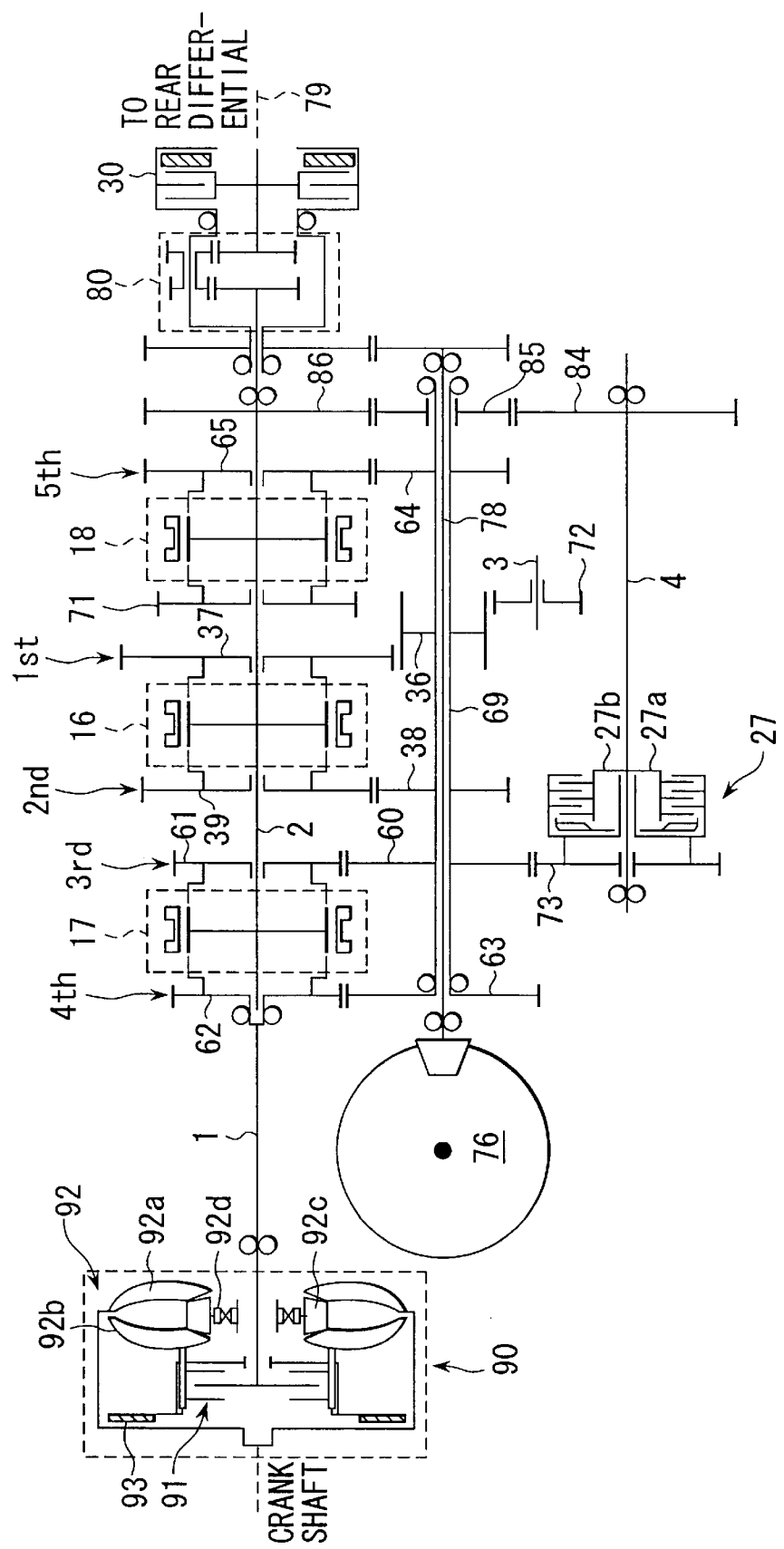
FIG. 14 is a skeleton diagram showing an automatic transmission according to a seventh embodiment of the present invention.

FIG. 14 is a skeleton diagram showing a five forward speed automatic transmission according to a seventh embodiment. This automatic transmission has the same structure as the transmission according to the fifth embodiment except for the power transmission mechanism 90. Further, the power transmission mechanism 90 has the same structure as the one described in the sixth embodiment. Accordingly, the automatic transmission of this embodiment has both effects and features described in the fifth and sixth embodiments.

Figure 15:
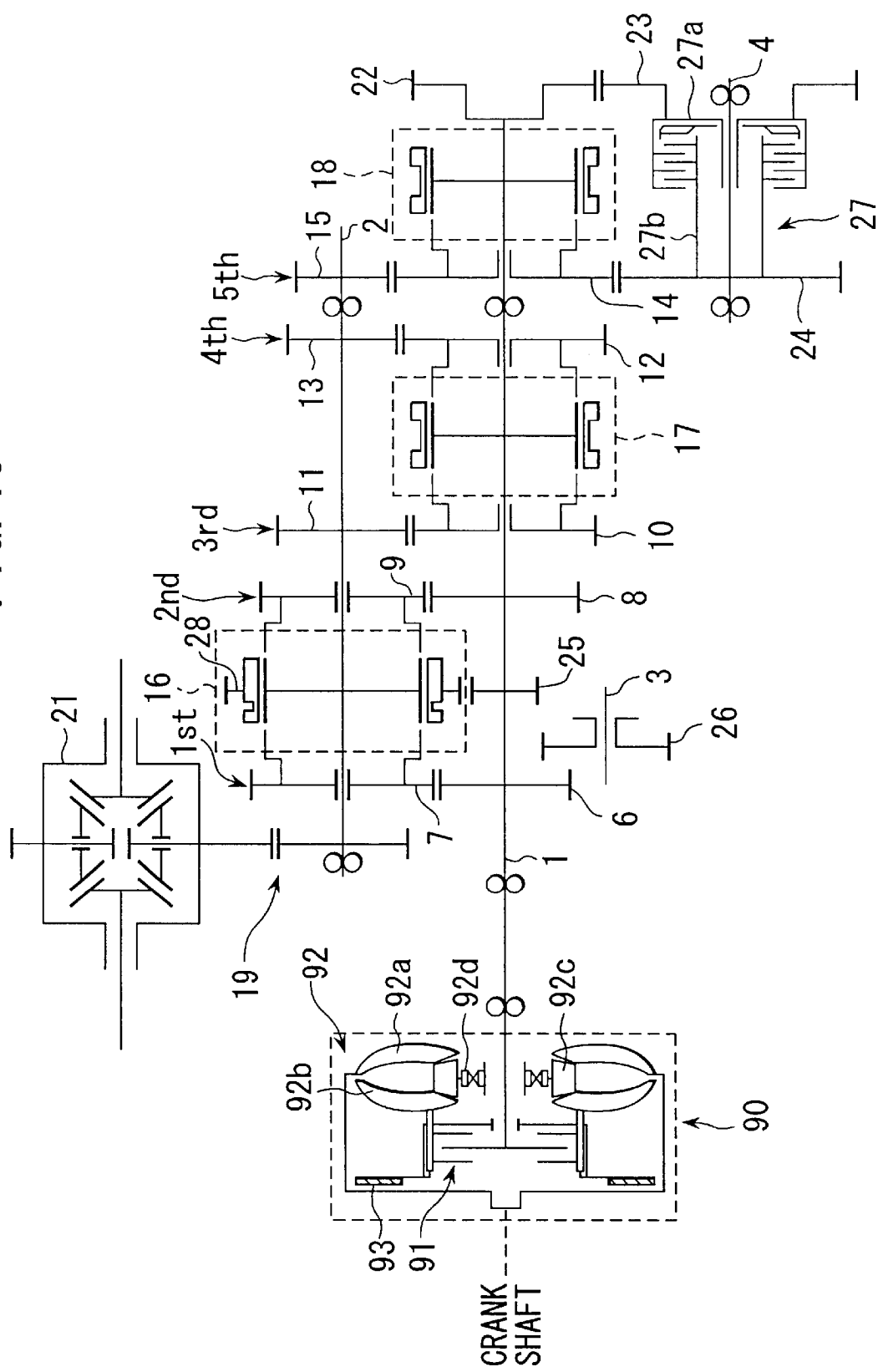
FIG. 15 is a skeleton diagram showing an automatic transmission according to an eighth embodiment of the present invention.

Further, FIG. 15 is a skeleton diagram showing a five forward speed automatic transmission according to an eighth embodiment of the present invention. This transmission is the same as that described in the first embodiment excepting the main clutch 5. The main clutch 5 is replaced with the power transmission mechanism 90 described in the sixth embodiment. Accordingly, this automatic transmission has advantages of using a torque converter in addition to the advantages provided by the first embodiment.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An automatic transmission having an input shaft, an output shaft disposed on an axis other than an axis of said input shaft, a main clutch for transmitting a power of an engine to said input shaft, shift gear trains for producing a specified gear ratio of said output shaft to said input shaft and a plurality of changeover mechanisms for automatically changing over said shift gear trains when shifting gears, comprising:

an intermediate shaft disposed on an axis other than axes of said input shaft and said output shaft; and a sub clutch mounting on said intermediate shaft for variably controlling a torque transmitted from said input shaft to said output shaft at shifting gears.

2. The automatic transmission according to claim 1, further comprising:

a first gear train provided between said input shaft and said intermediate shaft; and a second gear train provided between said intermediate shaft and said output shaft.

3. The automatic transmission according to claim 2, wherein a torque delivery path including said first gear train, said sub clutch and said second gear train is established at shifting gears.

4. The automatic transmission according to claim 2, wherein at least either of said first gear train and said second gear train includes a shift gear constituting said shift gear trains.

5. The automatic transmission according to claim 2, wherein said first gear train has a gear ratio for increasing or decreasing speed.

6. The automatic transmission according to claim 2, wherein said second gear train has a gear ratio for increasing or decreasing speed.

7. An automatic transmission having an input shaft, an output shaft, a main clutch for transmitting a power of an engine to said input shaft, shift gear trains for producing a specified gear ratio of said output shaft to said input shaft and a plurality of changeover mechanisms for automatically changing over said shift gear trains when shifting gears, comprising:

a plurality of mounting shafts for mounting respective shift gears of said shift gear trains;

an intermediate shaft disposed on an axis other than axes of said mounting shafts; and a sub clutch mounting on said intermediate shaft for variably controlling a torque transmitted from said input shaft to said output shaft when shifting gears, and further comprising:

a first gear train provided between said input shaft and said intermediate shaft; and a second gear train provided between said intermediate shaft and said output shaft, wherein a total gear ratio multiplying a gear ratio of said first gear train by a gear ratio of said second gear train has a value corresponding to a gear ratio ranging from the 3rd speed to the 4th speed.

8. An automatic transmission, having a plurality of changeover mechanisms for changing over shift gear trains, for automatically controlling said changeover mechanisms when shifting gears, comprising:

an input shaft for mounting shift gears on an input side constituting said shift gear trains;

an output shaft for mounting shift gears on an output side constituting said shift gear trains;

a main clutch for transmitting a power of an engine to said input shaft;

an intermediate shaft disposed on an axis other than axes of said input shaft and said output shaft;

a sub clutch mounted on said intermediate shaft and having a pair of rotating members;

a first gear mounted on said input shaft;

a second gear mounted on said intermediate shaft, meshing with said first gear for transmitting a power of said first gear to one side of said rotating members of said sub clutch;

a third gear mounted on said intermediate shaft and rotating integrally with the other side of said rotating members of said sub clutch; and a fourth gear mounted on said output shaft and meshing with said third gear for transmitting a power of said third gear to said output shaft.

9. The automatic transmission according to claim 8, wherein said sub clutch variably controls a torque transmitted from said input shaft to said output shaft when shifting gears.

10. The automatic transmission according to claim 8, wherein at least either of said first gear and said fourth gear is a shift gear constituting said shift gear trains.

11. The automatic transmission according to claim 8, further comprising:

a second intermediate shaft disposed on an axis other than axes of said input shaft, said output shaft and said intermediate shaft; and a fifth gear mounted on said second intermediate shaft.

12. The automatic transmission according to claim 11, wherein a power of said third gear is transmitted to the fourth gear through said fifth gear.

13. The automatic transmission according to claim 8, wherein a gear ratio of said first gear versus said second gear is a gear ratio for increasing or decreasing speed.

14. The automatic transmission according to claim 8, wherein a gear ratio of said third gear versus said fourth gear is a gear ratio for increasing or decreasing speed.

15. An automatic transmission, having a plurality of changing over shift gear trains, for automatically controlling said changeover mechanisms at shifting gears, comprising:

an input shaft;

a main clutch for transmitting a power of an engine to said input shaft;

a counter shaft to which a power of said input shaft is transmitted through a gear train, said counter shaft mounting a shift gear on one side constituting of said shift gear trains;

an output shaft disposed on the same axis as said input shaft, said output shaft mounting a shift gear on the other side constituting of said gear trains for receiving said power from said counter shaft through said shift gear trains;

an intermediate shaft disposed on an axis other than axes of said input shaft and said counter shaft; and a sub clutch mounted on said intermediate shaft and having a pair of rotation members for variably controlling a transmission torque transmitted from said input shaft to said output shaft when shifting gears.

16. The automatic transmission according to claim 15, further comprising:

a first gear train provided between said counter shaft and said intermediate shaft; and a second gear train provided between said intermediate shaft and said output shaft.

17. The automatic transmission according to claim 16, wherein a torque delivery path including said first gear train, said sub clutch and said second gear train is established when shifting gears.

18. The automatic transmission according to claim 16, wherein at least either of said first gear train and said second gear train includes a shift gear constituting said shift gear trains.

19. An automatic transmission having a plurality of changeover mechanisms for changing over shift gear trains, for automatically controlling said changeover mechanisms at shifting gears, comprising:

an input shaft;

a main clutch for transmitting a power of an engine to said input shaft;

a counter shaft to which a power of said input shaft is transmitted through a gear train for mounting a shift gear on one side constituting said shift gear trains;

an output shaft disposed on the same axis as said input shaft for mounting a shift gear on the other side constituting said gear trains;

an intermediate shaft disposed on an axis other than axes of said input shaft and said counter shaft; and a sub clutch mounted on said intermediate shaft and having a pair of rotation members for variably controlling a transmission torque transmitted from said input shaft to said output shaft when shifting gears, and further comprising:

a first gear train provided between said counter shaft and said intermediate shaft; and a second gear train provided between said intermediate shaft and said output shaft, wherein said first gear train includes a first shift gear mounted on said counter shaft and a first gear for transmitting a power of said first shift gear to one side of rotating members and said second gear train includes a second gear rotating integrally with the other side of rotating members of said sub clutch and a second shift gear for transmitting a power of said second gear to said output shaft.

20. The automatic transmission according to claim 16, wherein said first gear train has a gear ratio for increasing or decreasing speed.

21. The automatic transmission according to claim 16, wherein said second gear train has a gear ratio for increasing or decreasing speed.

22. An automatic transmission having a plurality of changeover mechanisms for changing over shift gear trains, for automatically controlling said changeover mechanisms at shifting gears, comprising:

an input shaft;

a main clutch for transmitting a power of an engine to said input shaft;

a counter shaft to which a power of said input shaft is transmitted through a gear train for mounting a shift gear on one side constituting said shift gear trains;

an output shaft disposed on the same axis as said input shaft for mounting a shift gear on the other side constituting said gear trains;

an intermediate shaft disposed on an axis other than axes of said input shaft and said counter shaft; and a sub clutch mounted on said intermediate shaft and having a pair of rotation members for variably controlling a transmission torque transmitted from said input shaft to said output shaft when shifting gears and further comprising:

a first gear train provided between said counter shaft and said intermediate shaft; and a second gear train provided between said intermediate shaft and said output shaft, wherein a total gear ratio multiplying a gear ratio of said first gear train by a gear ratio of said second gear train has a value corresponding to a gear ratio ranging from the 3rd speed to the 4th speed.

23. An automatic transmission having an input shaft, an output shaft disposed on an axis other than an axis of said input shaft, and a plurality of changeover mechanisms for automatically changing over shift gear trains when shifting gears, comprising:

power transmitting means including a first clutch for transuitting a power of an engine to said input shaft or shutting off said power to said input shaft and a torque converter provided upstream of said first clutch;

an intermediate shaft disposed on an axis other than axes of said input shaft and said output shaft; and a second clutch mounted on said intermediate shaft for variably controlling a transmission torque transmitted from said input shaft to said output shaft when shifting gears.

24. The automatic transmission according to claim 23, wherein
said power transmitting means further includes a lock-up clutch.

25. The automatic transmission according to claim 24, wherein
said first clutch, said second clutch and said lock-up clutch are controlled so as to be engaged or disengaged according to driving conditions.

26. The automatic transmission according to claim 23, further comprising:
a first gear train for transmitting a power of said input shaft to said intermediate shaft; and
a second gear train for transmitting a power of said intermediate shaft to said output shaft.

27. The automatic transmission according to claim 26, wherein
a torque delivery path including said first gear train, said second clutch and said second gear train is established when shifting gears.

28. The automatic transmission according to claim 26, wherein
at least either of said first gear train and said second gear train includes a shift gear constituting said shift gear trains.

29. The automatic transmission according to claim 26, wherein
said first gear train has a gear ratio for increasing or decreasing speed.

30. The automatic transmission according to claim 26, wherein
said second gear train has a gear ratio for increasing or decreasing speed.

31. An automatic transmission having an input shaft, an output shaft, and a plurality of hangeover mechanisms for automatically changing over shift gear trains when shifting gears, comprising:
a power transmitting means including a first clutch for transmitting a power of an engine to said input shaft or shutting off said power from said input shaft and a torque converter provided upstream of said first clutch;
a plurality of mounting shafts for mounting respective shift gears constituting said gear trains;
an intermediate shaft disposed on an axis other than axes of said mounting shafts; and
a second clutch mounted on said intermediate shaft for variably controlling a transmission torque transmitted from said input shaft to said output shaft when shifting gears, further comprising:
a first gear train for transmitting a power of said input shaft to said intermediate shaft; and
a second gear train for transmitting a power of said intermediate shaft to said output shaft, wherein
a total gear ratio multiplying a gear-ratio of said first gear train by a gear-ratio of said second gear train has a value corresponding to a gear ratio ranging from the 3rd speed to the 4th speed.

32. An automatic transmission having an input shaft, an output shaft, and a plurality of changeover mechanisms for automatically changing over shift gear trains when shifting gears, comprising:
power transmitting means including a first clutch for transmitting a power of an engine to said input shaft or shutting off said power to said input shaft and a torque converter provided upstream of said first clutch;
a counter shaft to which a power of said input shaft is transmitted through a gear train, said counter shaft mounting a shift gear on one side constituting of said shift gear trains;
an output shaft disposed on the same axis as said input shaft, said output shaft mounting a shift gear on the other side constituting of said gear trains for receiving said power from said counter shaft through said shift gear trains;
an intermediate shaft disposed on an axis other than axes of said input shaft and said counter shaft; and
a second clutch mounted on said intermediate shaft for variably controlling a transmission torque transmitted from said counter shaft to said output shaft when shifting gears.

33. The automatic transmission according to claim 32, wherein said power transmitting means further includes a look-up clutch.

34. The automatic transmission according to claim 33, wherein said first clutch, said second clutch and said lock-up clutch are controlled so as to be engaged or disengaged according to driving conditions.

35. The automatic transmission according to claim 32, further comprising:
a first gear train for transmitting a power of said input shaft to said intermediate shaft; and
a second gear train for transmitting a power of said intermediate shaft to said output shaft.

* * * * *